US012664988B2

(12) United States Patent 
Feast et al.

(10) Patent No.: US 12,664,988 B2 
(45) Date of Patent: Jun. 23, 2026

(54) EMPLOYEE EXPERIENCE SCORE

(71) Applicant: Verint Americas Inc., Alpharetta, GA (US)

(72) Inventors: Joshua Feast, Weston, MA (US); Ali Azarbayejani, Carlisle, MA (US); John Kane, Dublin (IE); Jorge Calzada, Needham, MA (US); Richard Brutti, Stow, MA (US); Kye Taylor, Castle Rock, CO (US); Assaf Pines, Needham, MA (US); Cristina Gorrostieta, Arlington, MA (US); Matt Roddy, Dublin (IE); Reza Lotfian, Revere, MA (US)

(73) Assignee: Verint Americas Inc., Alpharetta, GA (US)

( * ) Notice: Subject to any disclaimer, the term of this patent is extended or adjusted under 35 U.S.C. 154(b) by 220 days.

(21) Appl. No.: 18/538,803

(22) Filed: Dec. 13, 2023

(65) Prior Publication Data

US 2024/0203427 A1     Jun. 20, 2024

Related U.S. Application Data

(60) Provisional application No. 63/432,687, filed on Dec. 14, 2022, provisional application No. 63/432,799, (Continued)

(51) Int. Cl.
| | |
|---|---|
| *G10L 15/00* | (2013.01) |
| *G06Q 10/0639* | (2023.01) |

(Continued)

(52) U.S. Cl.
CPC ........ *G10L 17/06* (2013.01); *G06Q 10/06393* (2013.01); *G10L 15/02* (2013.01); *G10L 15/26* (2013.01); *G10L 25/63* (2013.01)

(58) Field of Classification Search
CPC ........ G06F 40/30; G06F 40/216; G06F 40/35; G10L 15/02; G10L 17/06; G10L 25/30;

(Continued)

(56) References Cited

U.S. PATENT DOCUMENTS

| | | | |
|---|---|---|---|
| 9,571,652 B1 * | 2/2017 | Zeppenfeld | .......... H04M 3/523 |
| 9,922,649 B1 | 3/2018 | Lore et al. | |

(Continued)

OTHER PUBLICATIONS

International Search Report and Written Opinion issued for International Patent Application No. PCT/US2023/083880, mailed on Mar. 20, 2024, 14 pages.

(Continued)

*Primary Examiner* — Md S Elahee 
(74) *Attorney, Agent, or Firm* — Meunier Carlin & Curfman LLC

(57) ABSTRACT

Techniques for monitoring and improving emotional well-being of an employee are described. Stream of audio data corresponding to a call between an employee and a customer may be received. One or more acoustic features and/or audio feature data may be generated from the audio data. Word embedding data corresponding to the audio data may be generated. An employee experience score may be generated using a machine learning (ML) model, word embedding data, and the one or more acoustic features, where the score corresponds to an experience level of the first speaker during the call with the second speaker. Based on the score, an action may be caused to be performed. In some embodiments, one or more notifications may be generated based on data related to the audio data, where at least notification is configured to improve an experience level for the first speaker.

20 Claims, 16 Drawing Sheets

Related U.S. Application Data filed on Dec. 15, 2022, provisional application No. 63/432,693, filed on Dec. 14, 2022, provisional application No. 63/432,806, filed on Dec. 15, 2022.

(51) Int. Cl.

| | | |
|---|---|---|
| *G10L 15/02* | (2006.01) |
| *G10L 15/26* | (2006.01) |
| *G10L 17/06* | (2013.01) |
| *G10L 25/63* | (2013.01) |

(58) Field of Classification Search
CPC ......... G10L 25/63; G10L 15/26; G10L 25/90; G10L 15/18; H04M 3/5175; H04M 2203/401; H04M 2201/40; H04M 2203/403; H04M 3/523; H04M 3/42221; G06Q 10/06393; G06Q 10/0639; G06Q 10/1053; H04L 51/10
USPC ......................................................... 704/236
See application file for complete search history.

(56) References Cited

U.S. PATENT DOCUMENTS

| | | | |
|---|---|---|---|
| 10,276,188 B2 | 4/2019 | Feast et al. |
| 10,741,169 B1 | 8/2020 | Trueba et al. |
| 11,004,444 B2 * | 5/2021 | Johnson, Jr. ............ G10L 15/18 |
| 11,244,698 B2 | 2/2022 | Feast et al. |
| 11,463,587 B1 * | 10/2022 | Williams .......... H04M 3/42221 |
| 11,915,248 B2 | 2/2024 | Gorny |
| 12,217,752 B2 | 2/2025 | Kane |
| 2017/0011233 A1 | 1/2017 | Xue et al. |
| 2017/0026514 A1 | 1/2017 | Dwyer et al. |
| 2021/0157834 A1 | 5/2021 | Sivasubramanian et al. |
| 2021/0158235 A1 | 5/2021 | Sivasubramanian et al. |
| 2022/0012672 A1 * | 1/2022 | Inman ................ G06Q 10/1053 |
| 2022/0172230 A1 | 6/2022 | Place |
| 2022/0172231 A1 | 6/2022 | Place |
| 2022/0201121 A1 | 6/2022 | Kane |
| 2022/0375468 A1 | 11/2022 | Kane |
| 2023/0067687 A1 | 3/2023 | Azarbayejani |
| 2024/0144089 A1 | 5/2024 | Britt et al. |
| 2024/0273304 A1 | 8/2024 | Gorny |
| 2024/0320489 A1 * | 9/2024 | Vandikas ................ H04L 51/10 |

OTHER PUBLICATIONS

Final Office Action for U.S. Appl. No. 18/538,700, mailed Dec. 10, 2025, 11 pages.

* cited by examiner

150
Employee
Audio Data

152
Combined
Audio Data

154
Customer
Audio Data

Figure 5A:
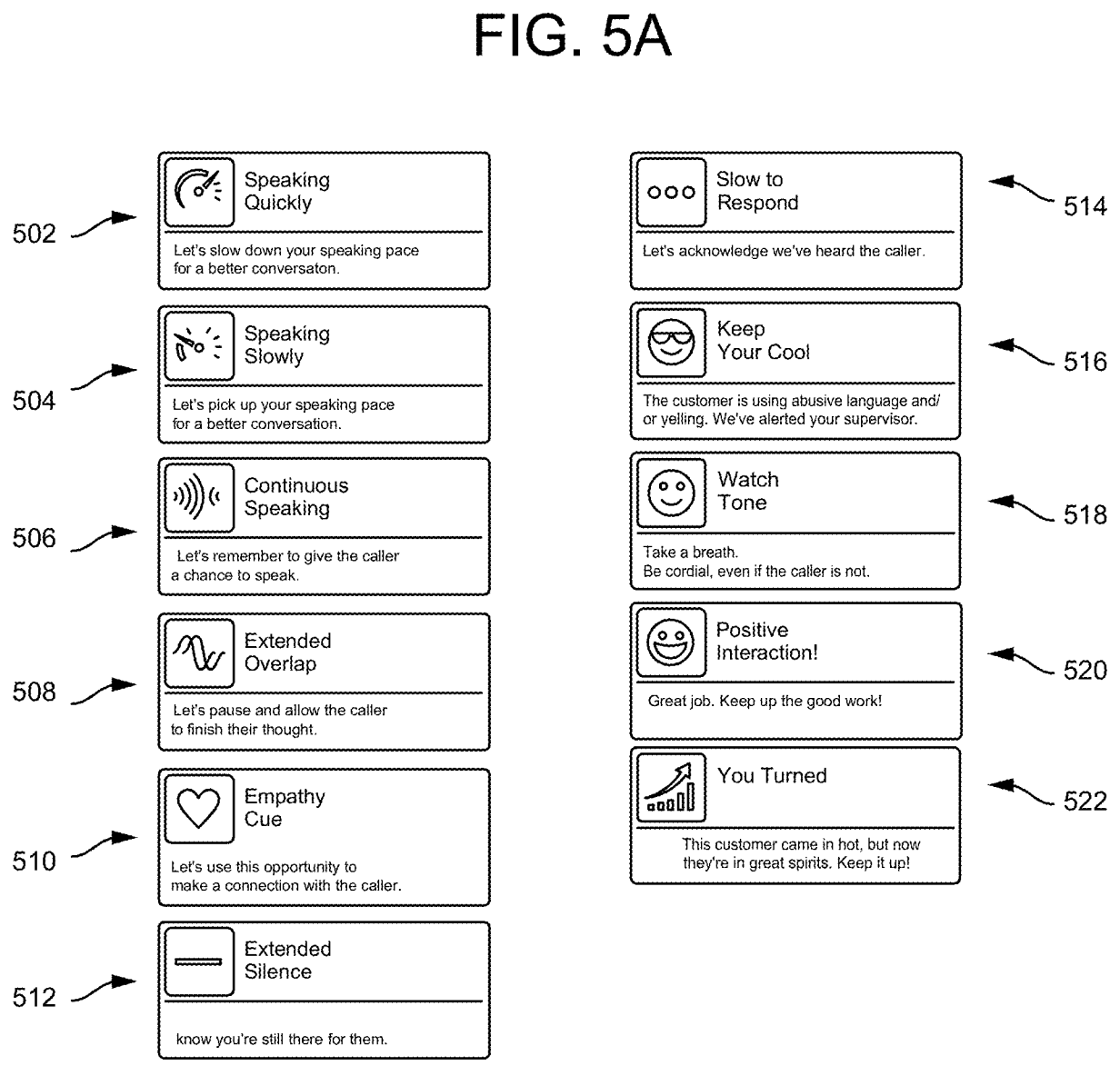

Speaking Quickly
Let's slow down your speaking pace for a better conversaton.
502

Speaking Slowly
Let's pick up your speaking pace for a better conversation.
504

Continuous Speaking
Let's remember to give the caller a chance to speak.
506

Extended Overlap
Let's pause and allow the caller to finish their thought.
508

Empathy Cue
Let's use this opportunity to make a connection with the caller.
510

Extended Silence
know you're still there for them.
512

Slow to Respond
Let's acknowledge we've heard the caller.
514

Keep Your Cool
The customer is using abusive language and/or yelling. We've alerted your supervisor.
516

Watch Tone
Take a breath. Be cordial, even if the caller is not.
518

Positive Interaction!
Great job. Keep up the good work!
520

You Turned
This customer came in hot, but now they're in great spirits. Keep it up!
522

FIG. 5B

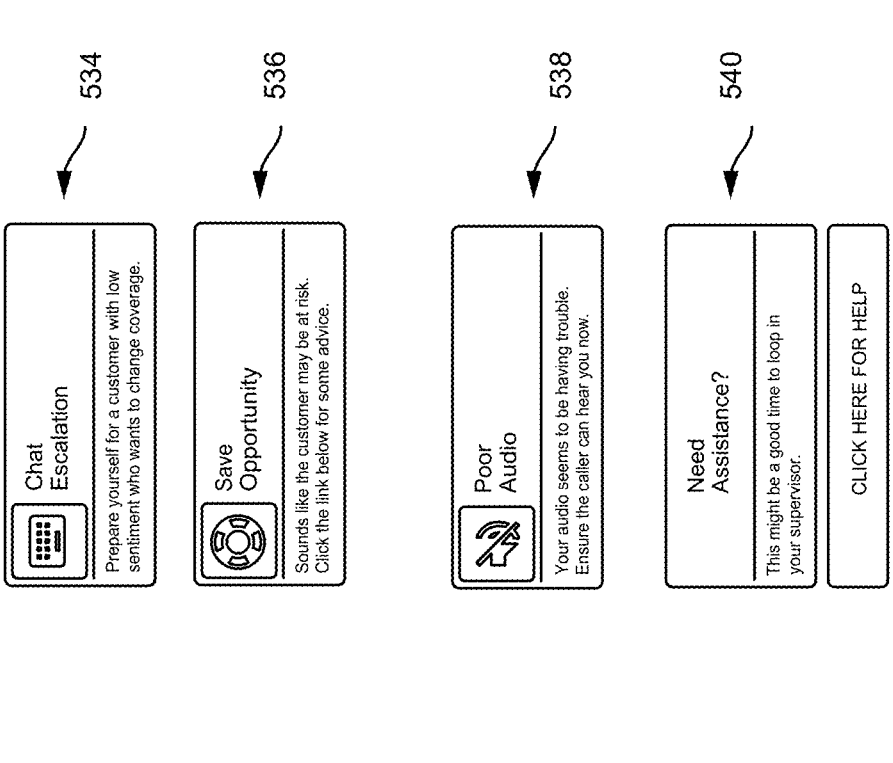

534 — Chat Escalation
Prepare yourself for a customer with low sentiment who wants to change coverage.

536 — Save Opportunity
Sounds like the customer may be at risk. Click the link below for some advice.

538 — Poor Audio
Your audio seems to be having trouble. Ensure the caller can hear you now.

540 — Need Assistance?
This might be a good time to loop in your supervisor.
CLICK HERE FOR HELP

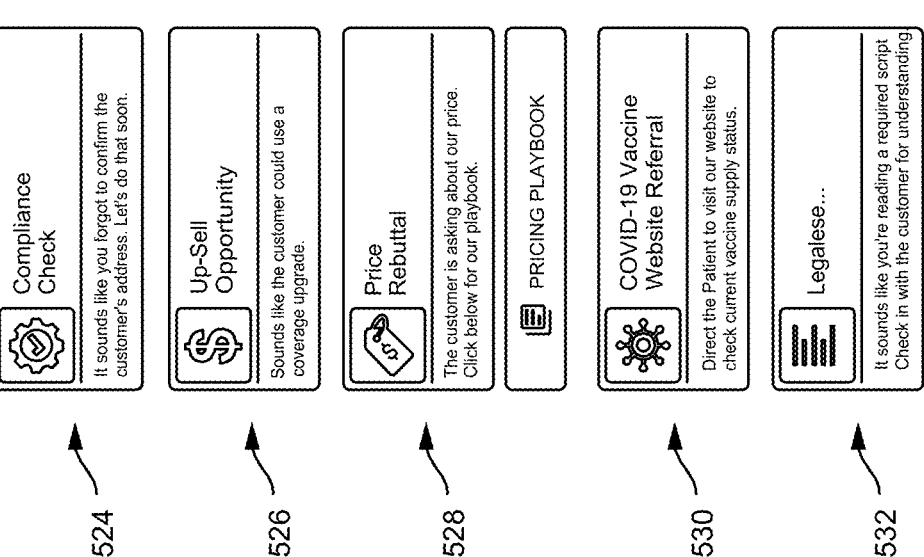

524 — Compliance Check
It sounds like you forgot to confirm the customer's address. Let's do that soon.

526 — Up-Sell Opportunity
Sounds like the customer could use a coverage upgrade.

528 — Price Rebuttal
The customer is asking about our price. Click below for our playbook.
PRICING PLAYBOOK 530 — COVID-19 Vaccine Website Referral
Direct the Patient to visit our website to check current vaccine supply status.

532 — Legalese...
It sounds like you're reading a required script. Check in with the customer for understanding.

GUI
702

GUI
802

FIG. 9

GUI
902

| Employee Experience 80% | | | | | |
|---|---|---|---|---|---|
| CX | EX | Agent Name | Date/Time ↑ | Call Length | Cues |
| 8 | 5 | Darius Brown | Jun 3 at 3:49 PM | 12m 8s | |
| △ | 4 | Agent Name | Jun 3 at 3:45 PM | 22m 43s | |
| 7 | 3 | Jerrell Tyson | Jun 3 at 3:42 PM | 19m 32s | |
| 9 | 5 | Luke Adams | Jun 3 at 3:39 PM | 11m 39s | |
| 6 | 3 | James Jefferson | Jun 3 at 3:32 PM | 9m 13s | |

GUI 1002

GUI
1102

| Time | | |
| 9:00 AM | | 6:00 PM |

Data Range ▸

Starred ▸

Agent Name ▸

Group Name ▸

EAI Cue ▸

CX Score ▸

EX Score ▸

CAI Cue ▸

CAI Speaker ▸

FIG. 12

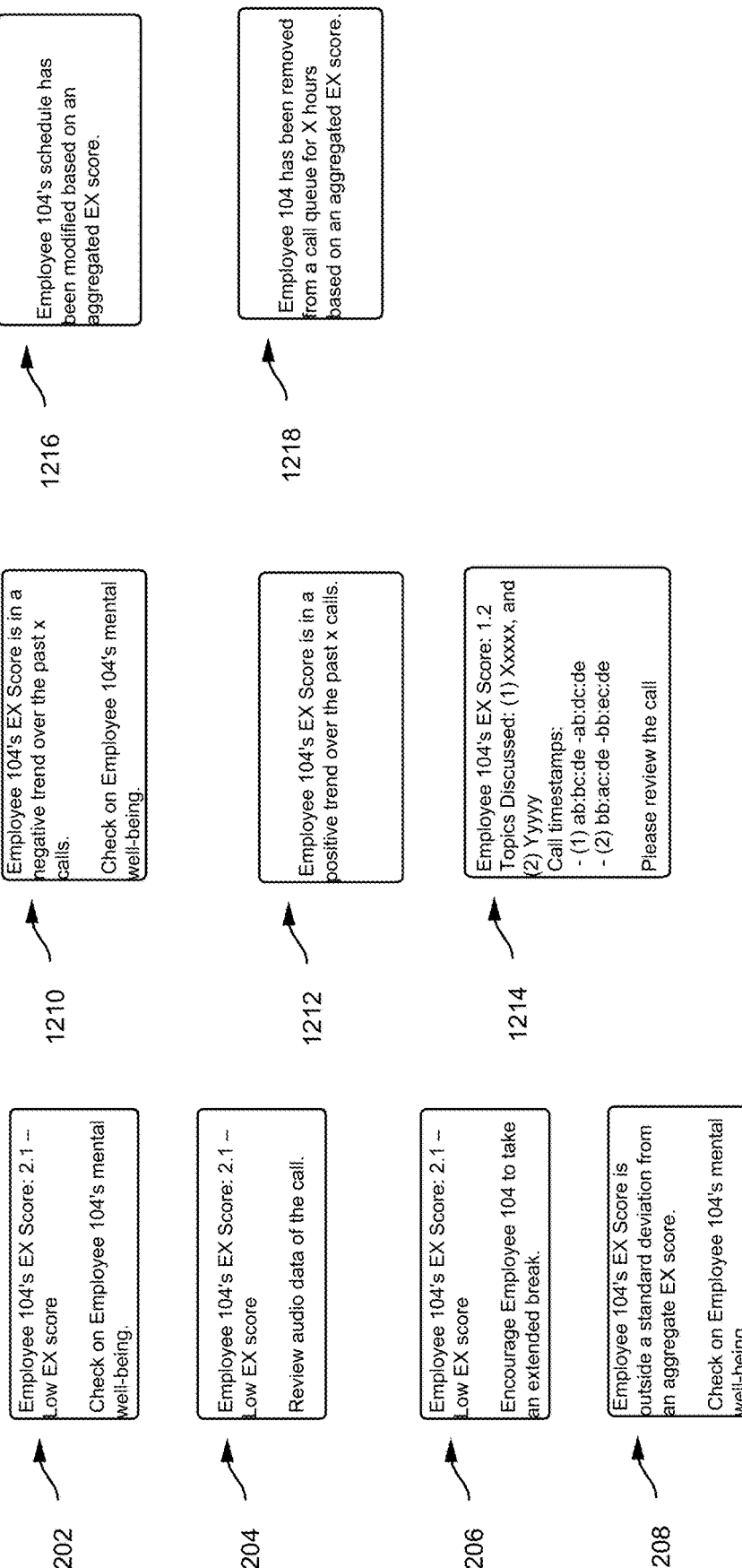

1202 — Employee 104's EX Score: 2.1 – Low EX score

Check on Employee 104's mental well-being.

1204 — Employee 104's EX Score: 2.1 – Low EX score

Review audio data of the call.

1206 — Employee 104's EX Score: 2.1 – Low EX score

Encourage Employee 104 to take an extended break.

1208 — Employee 104's EX Score is outside a standard deviation from an aggregate EX score.

Check on Employee 104's mental well-being.

1210 — Employee 104's EX Score is in a negative trend over the past x calls.

Check on Employee 104's mental well-being.

1212 — Employee 104's EX Score is in a positive trend over the past x calls.

1214 — Employee 104's EX Score: 1.2
Topics Discussed: (1) Xxxxx, and (2) Yyyyy
Call timestamps:
- (1) ab:bc:de -ab:dc:de
- (2) bb:ac:de -bb:ec:de Please review the call 1216 — Employee 104's schedule has been modified based on an aggregated EX score.

1218 — Employee 104 has been removed from a call queue for X hours based on an aggregated EX score.

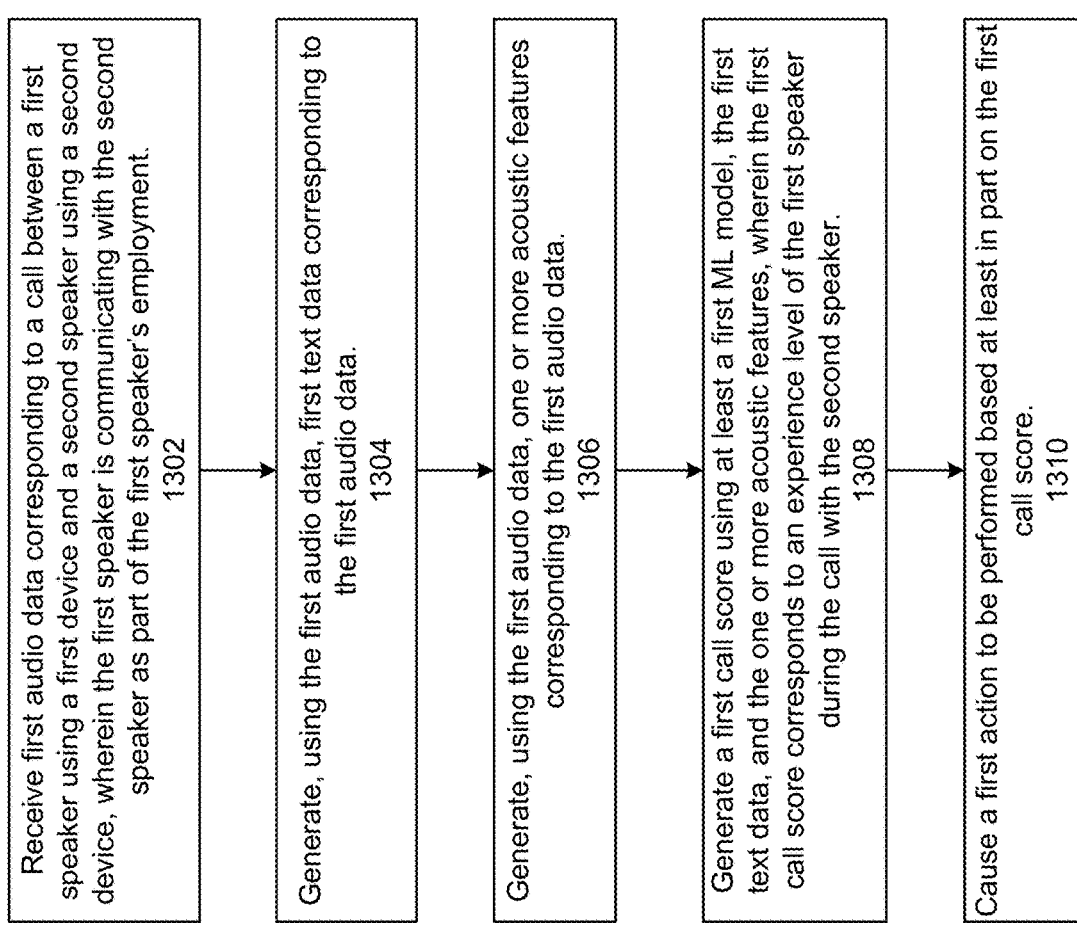

Receive first audio data corresponding to a call between a first speaker using a first device and a second speaker using a second device, wherein the first speaker is communicating with the second speaker as part of the first speaker's employment.
1302

Generate, using the first audio data, first text data corresponding to the first audio data.
1304

Generate, using the first audio data, one or more acoustic features corresponding to the first audio data.
1306

Generate a first call score using at least a first ML model, the first text data, and the one or more acoustic features, wherein the first call score corresponds to an experience level of the first speaker during the call with the second speaker.
1308

Cause a first action to be performed based at least in part on the first call score.
1310

FIG. 14

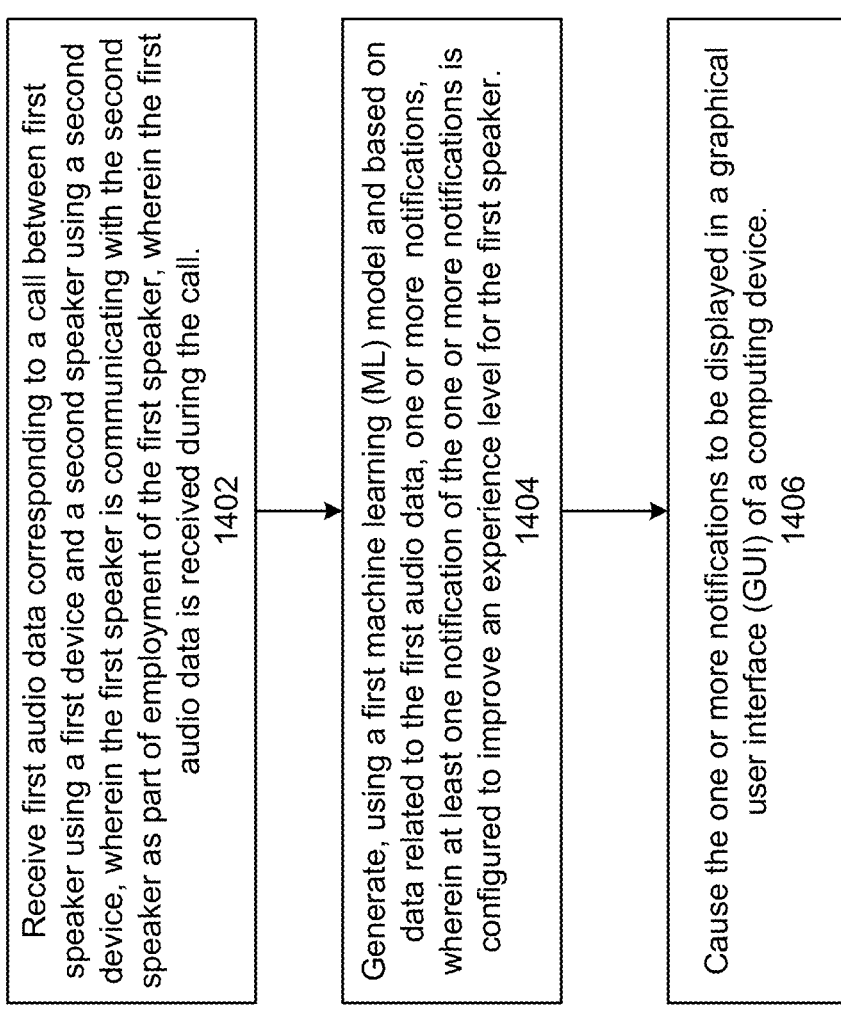

Receive first audio data corresponding to a call between first speaker using a first device and a second speaker using a second device, wherein the first speaker is communicating with the second speaker as part of employment of the first speaker, wherein the first audio data is received during the call.
1402

Generate, using a first machine learning (ML) model and based on data related to the first audio data, one or more notifications, wherein at least one notification of the one or more notifications is configured to improve an experience level for the first speaker.
1404

Cause the one or more notifications to be displayed in a graphical user interface (GUI) of a computing device.
1406

Figure 16:
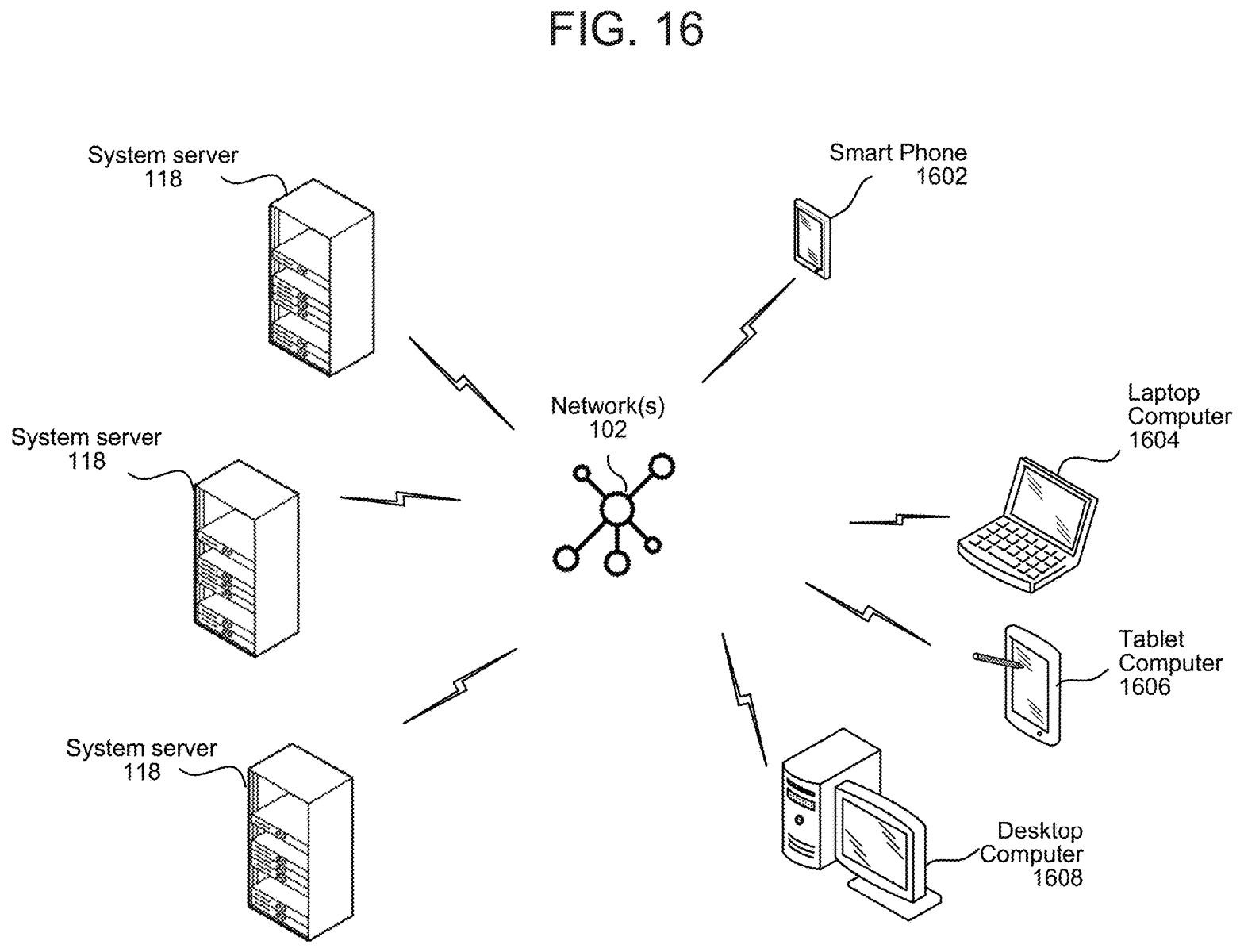

Smart Phone 1602

Laptop Computer 1604

Tablet Computer 1606

Desktop Computer 1608

Network(s) 102

System server 118

System server 118

System server 118

EMPLOYEE EXPERIENCE SCORE

CROSS-REFERENCE TO RELATED APPLICATIONS

This application claims priority to the following provisional patent applications:

U.S. Provisional Patent Application No. 63/432,687, filed Dec. 14, 2022 and titled "Overall Model—Tracking Audio Parameters for Each Call to Generate Employee-Based Actions to Perform."

U.S. Provisional Patent Application No. 63/432,799, filed Dec. 15, 2022 and titled "Overall Model—Tracking Audio Parameters for Each Call to Generate Employee-Based Actions to Perform."

U.S. Provisional Patent Application No. 63/432,693, filed Dec. 14, 2022 and titled "Actionable Insight—Automatic Steps to Take Based on Specific Behavioral Signals."

U.S. Provisional Patent Application No. 63/432,806, filed Dec. 15, 2022 and titled "Actionable Insight—Automatic Steps to Take Based on Specific Behavioral Signals."

The content of the above applications are hereby expressly incorporated herein by reference in their entireties.

BACKGROUND

Over the past several years, the volume and frequency of work for employees of a customer services organization, such as a customer care center, a customer call center, and other similar organizations, has increased significantly. For example, a customer call center employee may receive a larger volume of calls and at a higher frequency in single workday than the employee would have received previously. A large number of the calls that the customer call center employee receives may be from customers in heightened emotional states (e.g., angry, frustrated, rude, abusive, and the like), and the larger volume and higher frequency at which such calls are received may lead the employee to be at a receiving end of the customer's anger, frustration, abuse, and rudeness more often.

Additionally, many easy issues or transactions have been moved to self-service systems where a customer can resolve the issues or handle the transactions without reaching out to an employee of a customer care center. Therefore, an employee of a customer call center may more often deal with more difficult issues over a time period, such as a day or a week, than previously. Dealing with more difficult issues and difficult customers more often has detrimentally affected mental health of the employees. Furthermore, a large number of the call center jobs are fully remote or work-from-home jobs, which often cause the employees to feel more isolated and socially disconnected. Existing employee management systems fail to address the combination of detrimental effects on mental health and the feeling of isolation and social disconnection, leading to a significant rise in employee attrition.

SUMMARY

The present application is directed to a system and computer-implemented method for receiving first audio data corresponding to a call between a first speaker using a first device and a second speaker using a second device, wherein the first speaker is communicating with the second speaker as part of employment of the first speaker; generating, based on the first audio data, first text data corresponding to at least a portion of the call; generating, using the first audio data, one or more acoustic features corresponding to the first audio data; generating a first call score using at least a first machine learning (ML) model, and based on the first text data and the one or more acoustic features, wherein the first call score represents an experience level of the first speaker during the call with the second speaker; and causing a first action to be performed based at least in part on the first call score.

The first call score may be generated during the call. The system and computer-implemented method may also determine, based on the one or more acoustic features, at least one of a first sentiment of the first speaker or a second sentiment of the second speaker, wherein the first call score is generated based in part on the first sentiment or the second sentiment. The system and computer-implemented method may also determine, based on the first text data, at least one of a first sentiment of the first speaker or a second sentiment of the second speaker, wherein the first call score is generated based in part on the first sentiment or the second sentiment. The one or more acoustic features may comprise at least one of a vocal pitch indication corresponding to the first speaker or the second speaker, an energy indication corresponding to the first speaker or the second speaker, a speaking rate indication corresponding to the first speaker or the second speaker. The system and computer-implemented method may also generate word embedding data corresponding to the call, wherein the first call score is generated further using the word embedding data. The first text data may be text data from one or more chat messages or electronic mail associated with the call. The first call score may be generated for a first portion of the first audio data corresponding to a first time period of the call and the system and computer-implemented method may also generate a second call score based on a second portion of the first audio data.

The second portion of the first audio data may correspond to a second time period of the call and the first time period may be after the second time period and the first call score is generated in part by updating the second call score. The first audio data may comprise a first stream of audio data of the first speaker received via a first channel and a second stream of audio data of the second speaker received via a second channel different from the first channel. Performing the first action may comprise determining, based on the first call score, one or more first alerts indicating an action to be performed with respect to the first speaker; and causing data representing the first call score and the one or more first alerts to be displayed in a graphical user interface (GUI) of a computing device. The system and computer-implemented method may also determine using a second ML model, a second call score, wherein the second call score corresponds to an experience level of the second speaker during the call, and wherein causing the first action to be performed comprises causing data representing the first call score and the second call score to be displayed in a graphical user interface (GUI) of a computing device.

The present application is also directed to a system and computer-implemented method for receiving first audio data corresponding to a call between first speaker using a first device and a second speaker using a second device, wherein the first speaker is communicating with the second speaker as part of employment of the first speaker, wherein the first audio data is received during the call; generating, using a first machine learning (ML) model and based on first data related to the first audio data, one or more notifications, wherein at least one notification of the one or more notifications is configured to improve an experience level for the first speaker; and causing the one or more notifications to be displayed in a graphical user interface (GUI) of a computing device.

The experience level for the first speaker may correspond to an experience of the first speaker over an entirety of the call. The system and computer-implemented method may also determine based on at least a first call score, an aggregated call score for the first speaker, wherein the aggregated call score representing a cumulative experience level of the first speaker corresponding to multiple calls with multiple customers. The system and computer-implemented method may also determine whether the aggregated call score satisfies a threshold aggregated call score; and in response to the aggregated call score satisfying the threshold aggregated call score, modify a call schedule for the first speaker. Modifying the call schedule for the first speaker may comprise remove the first speaker from a call queue. The first data related to the first audio data may indicate a difference between the first call score and the aggregated call score satisfies a threshold difference; and the at least one notification may indicate data representing the first call score and a follow-up discussion with the first speaker. The first call score may be generated using a second ML model and the first audio data; and the first call score may correspond to an experience level of the first speaker during the call with the second speaker.

The system and computer-implemented method may also determine based in part on the first audio data, one or more topics discussed during the call; and identify one or more portions of the first audio data corresponding to the one or more topics, wherein the one or more notifications may indicate the one or more portions of the first audio data. The computing device may be associated with a supervisor of the first speaker. The at least one notification may be generated during the call. The first data may comprise a first call score corresponding to an experience level of the first speaker during the call, and wherein the at least one notification indicates that the first speaker requires assistance of a supervisor of the first speaker during the call. The system and computer-implemented method may also determine a call type corresponding to the call, wherein a first notification of the one or more notifications indicates the call type.

The system and computer-implemented method may also determine based on the first audio data, a first intent of the second speaker; determine, based on the first audio data, a first call score representing an experience level of the first speaker during the call; determine an average call score representing an average experience of an employee during a call related to the first intent; determine the first call score is below the average call score; and in response to determining that the first call is below the average call score, determine one or more topics associated with the first intent, wherein a first notification of the one or more notifications indicates additional training in the one or more topics. The system and computer-implemented method may also determine a group associated with the first speaker; determine, based on a plurality of call scores corresponding to a plurality of calls over a first time period, an average call score for the group; determine a call score representing an experience level of the first speaker during the call; and determine the call score is below the average call score, wherein a first notification of the one or more notifications indicates that the experience level of the first speaker is worse than an average experience level of the group.

BRIEF DESCRIPTION OF DRAWINGS

For a more complete understanding of the present disclosure, reference is now made to the following description taken in conjunction with the accompanying drawings.

FIG. 4 illustrates an example configuration of a neural network model for determining an employee experience score, according to aspects of the present disclosure.

FIGS. 5A-5B illustrate example graphical prompts that can be presented to an employee during a call with a customer, according to aspects of the present disclosure.

FIGS. 6-11 illustrate example graphical user interfaces (GUIs) for displaying employee experience data, according to aspects of the present disclosure.

FIG. 12 illustrates example graphical notifications that can be presented to an employee/supervising employee, according to aspects of the present disclosure.

FIG. 13 illustrates a flow diagram showing example operations by the system to determine an employee experience score, according to aspects of the present disclosure.

FIG. 14 illustrates a flow diagram showing example operations by the system to determine prompts based on an employee experience score, according to aspects of the present disclosure.

FIG. 16 illustrates a network according to embodiments of the present disclosure.

DETAILED DESCRIPTION

Figure 1:
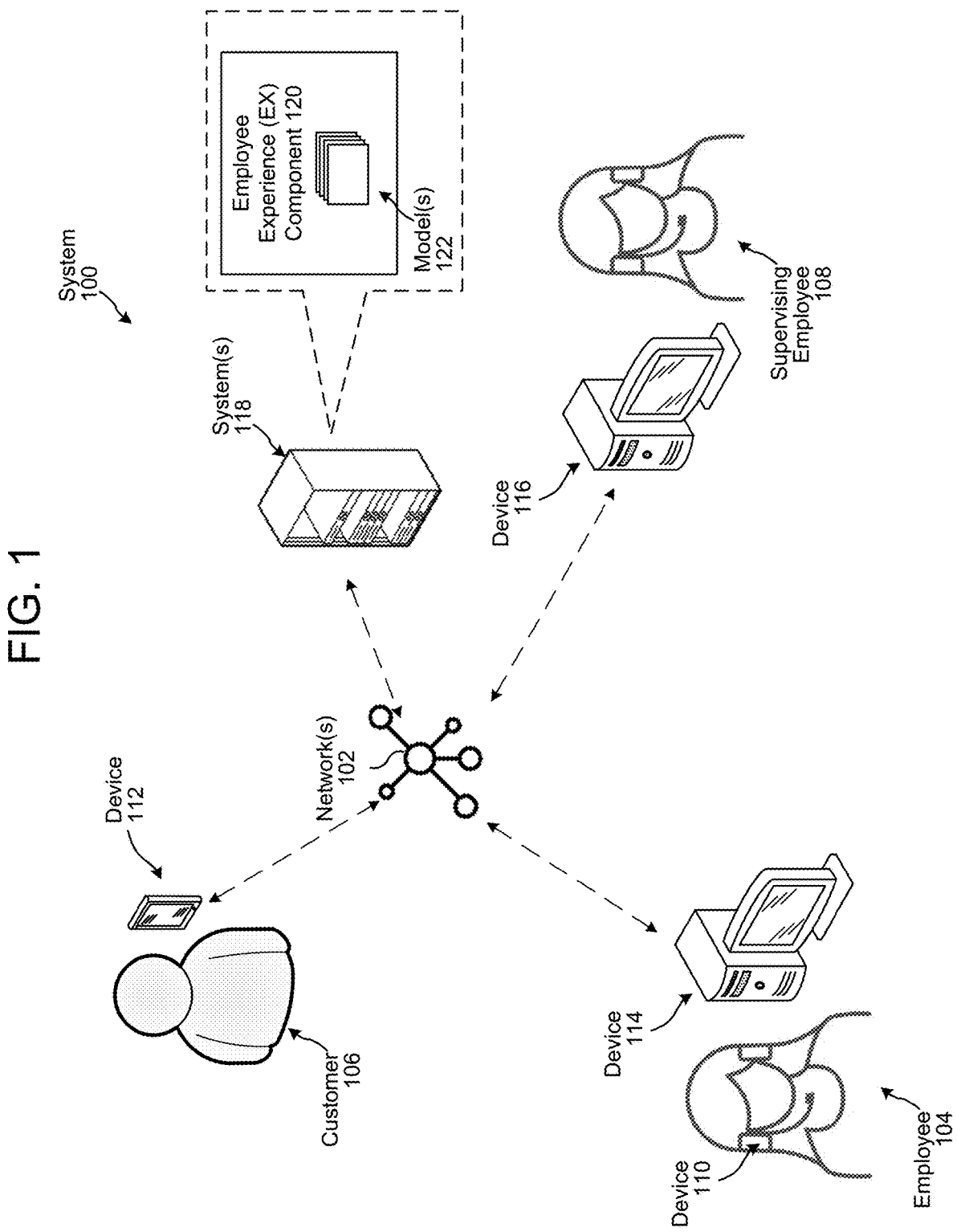
FIG. 1 illustrates system components configured to determine a score that measures the experience of an employee during a call with a customer, according to aspects of the present disclosure.

As described above, existing systems are not equipped or configured to monitor mental well-being of employees, such as employees in a customer assistance center or a customer call center. The existing systems fail to identify detrimental effects of high volume or high stress jobs on the mental well-being of the employees. For example, an employee of a customer call center may deal multiple difficult customers over a few days, where the difficult customers may abuse the employee, be rude to the employee, shout at the employee, and/or express their heightened emotional state towards the employee. In response to such treatment from the customers, the employee's mental health may be detrimentally affected, and the employee may begin to not enjoy their job, be less engaged with the job, feel unappreciated by the employer, and/or have a worse mental health than prior to starting the job. Such deteriorated mental health may lead to high employee turnover and increase difficulty of their existing jobs.

The present disclosure describes, among other things, techniques for determining and/or measuring an experience score for a user associated with an organization, such as an employee of an organization, in a call with another user, such as a customer. The experience score for the user associated with the organization may be referred to herein as an "employee experience score." The present disclosure further describes techniques for using the employee experience score to further improve an employee's experience, both with the organization and with customers, which may lead to increased employee satisfaction, customer satisfaction from working with more satisfied employees, and potentially lead to other benefits such as reduced overall employee turnover for the organization. Furthermore, the present disclosure also describes techniques for using an employee score, determined in real-time or near real-time, to guide an employee in real-time or near real-time to improve a customer's experience during the call, which in turn may improve the employee's experience during the call. Additionally, the present disclosure also describes techniques for determining employee scores across multiple lines of businesses (LOBs), multiple locations, multiple teams, multiple employees, and providing one or more notifications to a supervising employee (e.g., supervisor, manager, quality assurance (QA) manager, director, and the like) about changes to the an employee score.

In some embodiments, a technique of the present disclosure is configured to receive audio data corresponding to a call between a first speaker (e.g., an employee) using a first device and a second speaker (e.g., a customer) using a second device, generate a first embedding data corresponding to the first audio data (and/or embedding data from text of the first audio data) using a first machine learning (ML) model, and generate, using at least a second ML model and the first embedding data, a first call score (e.g., an employee experience score), where the first call score corresponds to an experience level of the first speaker during the call with the second speaker. The technique is further configured to determine one or more alerts based on the first call score and to cause the first call score and the one or more alerts to be displayed in a graphical user interface (GUI) of a computing device. The alerts may provide information regarding the experience of one or more employees, for example to a supervisor of the organization or other individual who may be able to take steps to improve the experience for the individual employee (such as recommending a break, etc.) and/or for a group of employees (such as organizing group training regarding difficult customer behaviors, etc.).

In some embodiments, a technique of the present disclosure is configured to receive first audio data corresponding to a first speaker (e.g., an employee) during a call with a second speaker (e.g., a customer), and during the call, generate a first call score (e.g., employee experience score) corresponding to the first speaker using a first ML model. The technique is further configured to generate, during the call, using a second ML model, one or more guidance prompts for the first speaker, where the one or more guidance prompts are configured to improve an experience level for the second speaker, and during the call, causes the first set of guidance prompts to be displayed in a GUI of a computing device associated with the first speaker. The prompts may assist the employee with taking actions to improve the employee's performance/experience such as suggesting actions to take with regard to the customer (e.g., particular voice prompts), actions for the employee to take (e.g., recommending a break, requesting assistance, etc.), or similar actions.

FIG. 1 shows a system 100 configured to determine an employee experience score for one or more employees of an organization. As shown in FIG. 1, the system 100 may include multiple devices such as devices 110, 112, 114, 116, in communication with systems 118 across one or more networks 102. The networks 102 may include a telephone network with call routing and call switching components and/or hardware, cellular network hardware, the Internet and/or any other wide-area network or local-area network, which may include wired and/or wireless networks. Devices 110, 112 may be any computing device configured to initiate and receive a call, such as a telephone call, a voice over Internet Protocol (VOIP) call, video call, and the like, and may be configured to communicate with other devices and systems of system 100 asynchronously.

Customer 106 and employee 104 may be in communication with each other to provide assistance to the customer 106 as part of a call related to the customer 106 and an organization. The employee 104 may be an employee of the organization or may be an employee of a contractor of the organization who is responsible for managing customer interactions. The customer 106 and the employee 104 may be communicating with each other via device 112 and device 114, respectively. The customer 106 and the employee 104 may be communicating with each other via a call, such as a telephone call, VOIP call, video call, and the like. The communication between the customer 106 and the employee 104 may be an asynchronous communication.

The system(s) 118 may be configured to receive data associated with the communication between the customer 106 and the employee 104. The data associated with the communication may include audio data of the communication (e.g., call), and non-audio data associated with the communication. For the audio data of the communication, the system(s) 118 may receive a separate stream of audio data of the customer 106 and a separate stream of audio data of the employee 104. In some embodiments, the customer 106 and the employee 104 may be communicating with each other via two different channels, and the system(s) 118 may receive the separate streams of audio data of the communication from the different channels. The system(s) 118 may be configured to determine whether a received stream of audio data is associated with the employee 104 or customer 106 based on the channel via which the stream of audio data is received. For example, the system(s) 118 may be configured to determine that a first channel is associated with the employee 104 based on the first channel being associated with one or more microphones or a microphone array of the device 110 associated with the employee 104, and the system(s) 118 may determine that a first stream of audio data is associated with the employee 104 based on the first stream of audio data being received via the first channel. Similarly, the system(s) 118 may be configured to determine that a second channel is associated with the customer 106 based on the second channel being associated with one or more microphones or a microphone array of the device 112 associated with the customer 106, and the system(s) 118 may determine that a second stream of audio data is associated with the customer 106 based on the second stream of audio data being received via the second channel.

The system(s) 118, as shown in FIG. 1, may include an employee experience (EX) component 120. The EX component 120 may be configured to process the received audio data to extract acoustic and/or audio features corresponding to the audio data of the communication. The EX component 120 may extract separate acoustic and/or audio features for the customer 106 and the employee 104. For example, the EX component 120 may extract acoustic and/or audio features for the employee 104 by processing received audio data associated with the employee 104. Similarly, the EX component 120 may extract acoustic and/or audio features for the customer 106 by processing received audio data associated with the customer 106. Examples of the extracted acoustic and/or audio features include, but are not limited to, time frequency spectral coefficients (e.g., mel frequency cepstral coefficients (MFCCs)), audio pitch, audio energy, and the like. The EX component 120 may extract the acoustic and/or audio features for the duration of the communication between the customer 106 and the employee 104.

Figure 2:
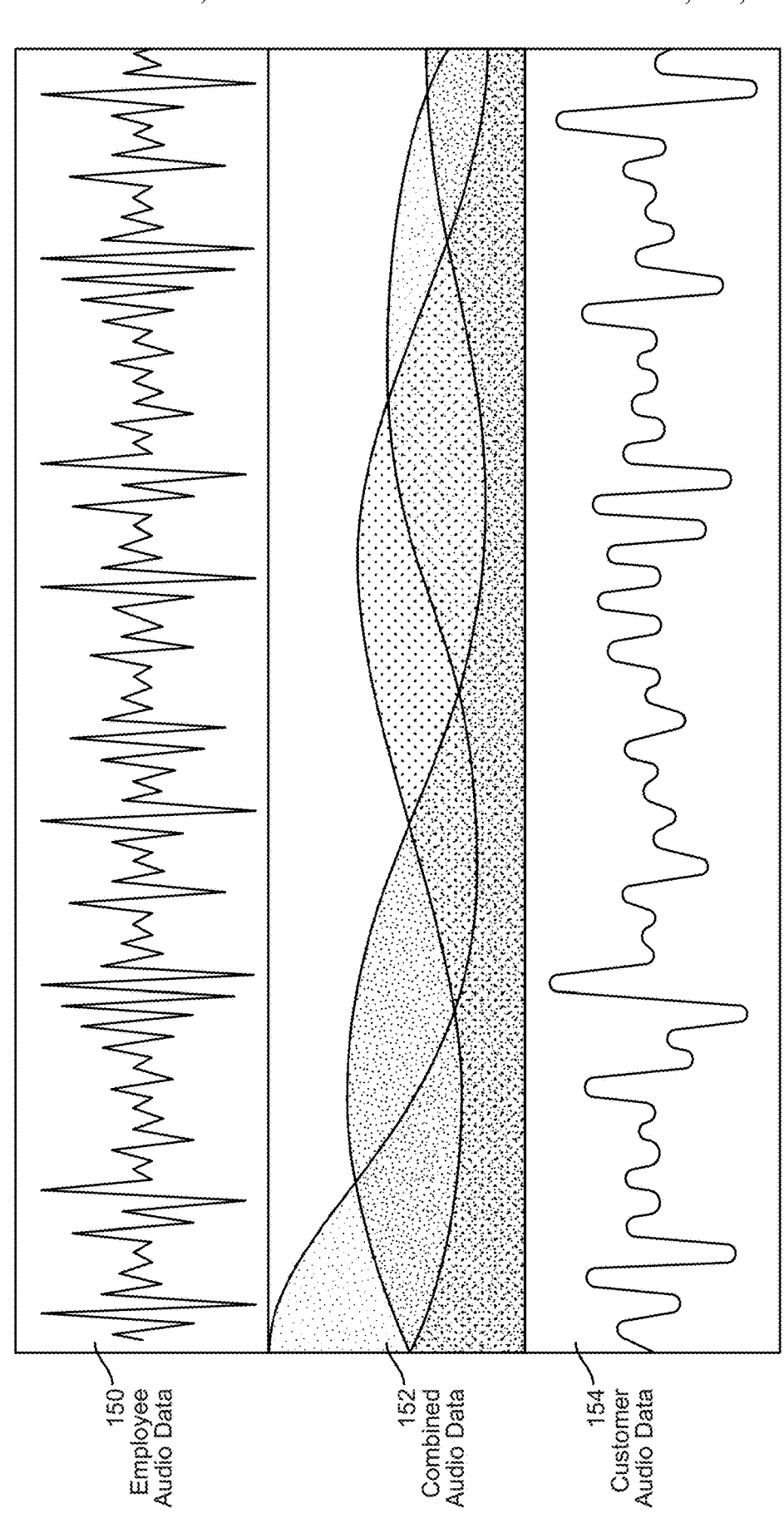
FIG. 2 illustrates audio data inputs that can be used to determine an employee experience score, according to aspects of the present disclosure.

The EX component 120 may process the received streaming audio data using a sliding window approach, where different snippets (e.g., every 16 milliseconds) of the received streaming audio data are processed to extract the acoustic and/or audio features corresponding to that snippet of the received streaming audio. For example, the EX component 120 may process the first 16 milliseconds of the received stream of audio data for customer 106 and may extract acoustic and/or audio features for the first 16 milliseconds, then the EX component 120 may process the next 16 milliseconds of the received stream of audio data for customer 106 and may extract acoustic and/or audio features for that next 16 milliseconds, and so on. The EX component 120 may similarly process the received stream of audio data for the employee 104 and extract the corresponding acoustic and/or audio features for the employee 104. The EX component 120 may be configured to extract acoustic and/or audio features from the combined audio data of each of the received stream of audio data. For example, the EX component may combine the received streams of audio data for the customer 106 and the employee 104, and extract the acoustic and/or audio features from the combined streams of audio data. In some embodiments, the EX component 120 may time-align the received streams of audio data and combine the time-aligned received streams of audio data. An example of the combined stream of audio data is shown in FIG. 2. In FIG. 2, employee audio data 150 represents the stream of audio data from the employee 104 during the call with the customer 106, and customer audio data 154 represents the stream of audio data from customer 106 during the call. Combined audio data 152 represents the combination of the stream of audio data 150 and 152 by the EX component 120. The combined audio data 152 may be time-aligned based on the timestamps of the employee audio data 150 and the customer audio data 154.

Figure 3:
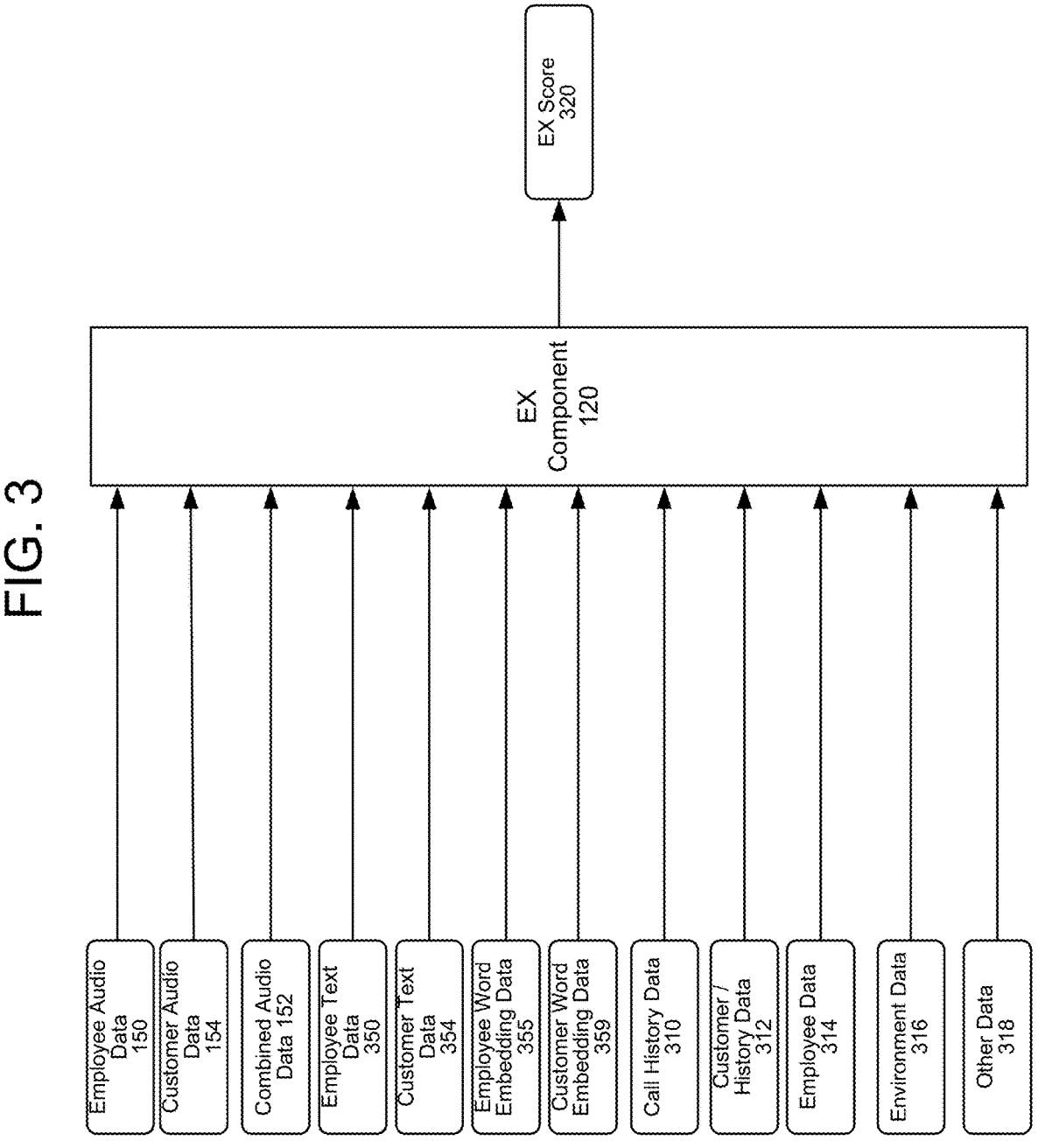
FIG. 3 illustrates inputs to a model for determining an employee experience score, according to aspects of the present disclosure.

Referring to FIG. 3, the EX component 120 may process a variety of data in various forms to determine an EX score 320. The data shown in FIG. 3 may be encoded prior to be processed by the EX component 120 or the EX component 120 may include one or more encoders for encoding input data for processing by the various model(s) 122. The EX component 120 may also include other component(s) that can perform processing on various input data to determine other intermediate data that may be processed to determine EX score 320. For example, the EX component 120 (or other component(s)), using extracted acoustic and/or audio features taken from 150/152/154, may be configured to determine and/or detect audio events, individual speaking patterns (e.g., individual speaking patterns of the employee 104 and customer 106), and interaction patterns (e.g., interaction patterns between the employee 104 and the customer 106). Examples of audio events may include, but are not limited to, speech detection in the processed snippet of audio data, detection of non-speech vocalizations (e.g., laughter, fillers, etc.) in the processed snippet of audio data, silence or lack of speech or non-speech vocalizations in the processed snippet of audio data. Examples of individual speaking patterns may include, but are not limited to, speaking rate of the speakers (e.g., employee 104, customer 106), vocal tension of the speakers (e.g., employee 104 and customer 106), changes in tone of the speakers, changes in pitch of the speakers, emotional intensity of the speakers, emotional valence (e.g., positive, negative, neutral) of the speakers, classification of the speakers into an emotional categories (e.g., happy, sad, angry, fearful, surprised, anxious, and the like), and/or other speaker behaviors or speech trends. Examples of interaction patterns may include, but are not limited to, turn-taking between the speakers (e.g., employee 104, customer 106) during the communication, and/or differences between the above-described individual speaking patterns of the speakers. Example of differences between the individual speaking patterns of the speakers may include, but are not limited to, difference in speaking rates of the speakers, difference in tone of the speakers, difference in pitch of the speakers, difference in emotional intensity of the speakers, and the like.

The EX component 120 may be configured with a set of trained machine learning (ML) models 122. Some ML models of the set of ML models 122 may be configured to receive, as inputs, the extracted acoustic and/or audio features, and may be trained to output values that indicate detection one or more of the audio events described above. Some ML models of the set of ML models 122 may be trained to output values that indicate one or more of the individual speaking patterns described above based on inputs of the extracted acoustic and/or audio features. Some ML models of the set of ML models 122 may be trained to output values that indicate one or more of the interaction patterns described above based on the extracted acoustic and/or audio features received as inputs to the ML models. In some embodiments, one ML model 122 may be configured and trained to output values that indicate detection of above-described audio events, indicate one or more of the above-described individual speaking patterns, and/or indicate one or more of the above-described interaction patterns. The EX component 120 may determine and/or detect above-described audio events, individual speaking patterns, and interaction patterns using such ML model(s) 122 and the extracted acoustic and/or audio features. For example, the extracted acoustic and/or audio features may be provided as inputs to such ML model(s) 122 and, based on outputs of those ML model(s) 122, the EX component 120 may detect any of the above-described audio events, individual speaking patterns, interaction patterns, and the like.

The EX component 120, or some other component (not shown separately in FIG. 1), may be configured to perform automatic speech recognition (ASR) to generate text data corresponding to the processed stream of audio data. For example, the EX component 120 may be configured with ASR model or components, and using ASR, the EX component 120 may generate the text data corresponding to the processed stream of audio data (e.g., employee text data 350 for employee audio data 150, and customer text data 354 for customer audio data 154, as shown in FIG. 3). Employee text data 350 and/or customer text data 354 may also be obtained from a text-based exchange (e.g., a text chat or the like) between customer 106 and employee 104. Such a text chat may be in addition to the audio call between customer 106 and employee 104. Using the generated text data (e.g., 350/354), the EX component 120 may generate word embedding data or word vectors corresponding to the text data (e.g., employee word embedding data 355 and customer word embedding data 359, as shown in FIG. 3). For example, one or more of the ML models 122 may be trained natural language processing (NLP) model or word embeddings model, such as trained Word2Vec, Global Vectors for Word Representation (GloVe), and the like, and using the generated text data and the NLP or word embeddings model, the EX component 120 may generate the word embedding data corresponding to the text data.

As described above, the system(s) 118 may receive non-audio data associated with the communication between the customer 106 and the employee 104. Examples of non-audio data associated with the communication may include, but are not limited to, chat messages, electronic mail (email) messages, and other digital interactions comprising text related to and/or associated with the communication between the customer 106 and the employee 104, such as call history data 310. In some embodiments, the text data of the non-audio data may indicate intent of communication between the customer 106 and the employee 104. For example, the indicated intent in the text data may describe a purpose (e.g., assistance with technical issue(s), assistance with bill payment, question(s) about product(s), question(s) about features of a product, and the like) of the customer 106 contacting the organization of the employee 104. The EX component 120 may be configured to use text data of the non-audio data associated with the communication to generate word embedding data corresponding to the text data.

Other examples of non-audio data associated with the communication may include metadata associated with the communication between the customer 106 and the employee 104. Examples of metadata may include, but are not limited to, employee data 314, as shown in FIG. 3, and employee data 314 may include data indicating work experience (e.g., number of years of work experience) of an employee (e.g., employee 104), length (e.g., days, weeks, months, years, and/or other time periods) of employment with the current organization of the employee, and the like. Other examples of metadata may include, but are not limited to, customer history data 310, as shown in FIG. 3, and customer history data 312 may include data indicating behavioral characteristics of a customer (e.g., customer 106), such as whether the customer is a difficult customer, a rude customer, an angry customer, and the like. In some embodiments, the metadata may include environment data 316, as shown in FIG. 3, and environment data may include data indicating device information an employee (e.g., device 110 of employee 104) and a customer (e.g., device 112 of customer 106). In some embodiments, the metadata may include other data 318, as shown in FIG. 3, and the other data may include data related the number of calls the employee has had so far in the day, the time of the day, and the like. In some embodiments, the metadata may be indicated in numerical values or numerical vectors. In some embodiments, the EX component 120 may generate numerical values or numerical vector data corresponding to the metadata. Various techniques for incorporating audio data with other data to perform behavioral analysis may be used. Examples of such techniques are discussed in Published U.S. Patent Application US 2022/0375468 published on Nov. 24, 2022 in the name of Cogito Corporation (and corresponding to U.S. patent application Ser. No. 17/749,677 filed on May 20, 2022). The above patent application is herein incorporated by reference in its entirety.

While there is certain data that may be used for both EX scoring and customer experience (CX) scoring, EX scoring may be different from CX scoring in a number of ways. CX scoring is focused on the experience of the customer, which may include various factors such as how well the customer is being treated, how well the customer appears to be understanding information being provided to him/her, how accurately the customer's problem is being addressed, how quickly the customer's problem is being addressed, how long the customer had to wait on hold to reach an employee, how many times the customer has called with one or more problems, how many times the customer had to call to have a certain problem addressed, and various other customer facing factors. EX scoring, on the other hand, is focused on the experience of the employee, which may include various factors such as how long an employee has been dealing with a particular customer, how difficult a particular customer is being, how many difficult customers the employee has dealt with during a specific time period (e.g., hour, day, week), how long has the employee been speaking with customer(s) since a recent break, how long the employee has been working overall for a time period (e.g., day, week, month), the environment in which the employee is taking calls, the seniority of the employee, how well the employee is trained (and/or how well trained the employee feels), how well the employee is supported (and/or how well supported the employee feels), the subject matter of calls the employee is handling, and various other employee facing factors. By training and operating an EX component 120, the present system offers techniques and methods to evaluate an employee experience and take action accordingly, which provides helpful information above and beyond what may be available using CX scoring. While CX scoring and EX scoring may be used together as part of a comprehensive system, EX scoring as disclosed is different from CX scoring.

Figure 4:
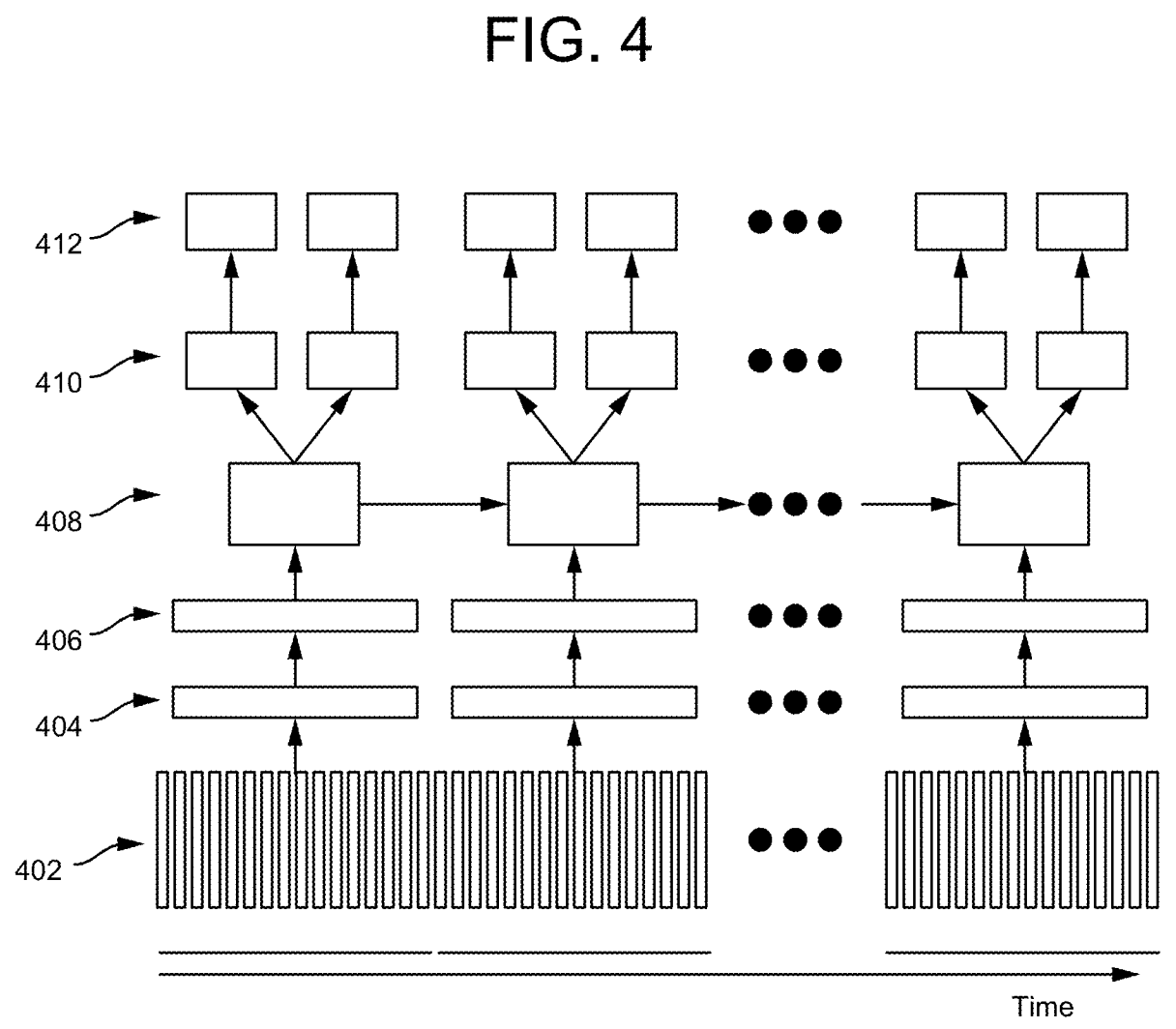

The EX component 120 may be configured to provide, as inputs, the extracted acoustic and/or audio features, the generated word embedding data, and/or the metadata or vector representation of the metadata to at least one ML model 122. The ML model 122 may be configured to receive as inputs, the extracted acoustic and/or audio features, the generated word embedding data, and/or the metadata and/or vector representation of the metadata, and the ML model 122 may be trained to output value(s) indicating or predicting an experience of the employee 104 during the communication with the customer 106 based on the received inputs. An example architecture of the ML model 122 is described below with reference to FIG. 4, Referring to FIG. 4, the example architecture of an ML model 122 may include an input layer 402 configured to receive input feature data described herein. The architecture may include one or more layers configured to compress the received feature data, such as layers 404, 406. In some embodiments, one or more layers configured to compress feature data may be fully connected. The architecture may include one or more recurrent layers 408 for sequence modeling to configure the Model 122 to maintain context and/or memory of predicted output value(s) at previous time intervals for predictions during current and future time intervals. In some embodiments, the one or more recurrent layers 408 may be a Long Short-Term Memory (LSTM) layer. The architecture may include one or more layers 410 for task specific classification. A model 122 may be configured to classify one or more tasks. For example, an ML model 122 may be configured to classify an emotional state of an employee, emotional state of a customer, a positive or a negative valence of a customer, and the like. The architecture may include an output layer 412 to output a value indicating a likelihood of the classified task. For example, the output layer may output a value indicating an emotional state of the employee, a value indicating an EX score described herein, and the like.

The ML model 122 being trained to output value(s) based on inputs that include extracted acoustic and/or audio features and the generated word embedding data and the metadata associated with the communication, improves accuracy of predicting an employee's experience during the communication with a customer by the ML model 122. For example, during the call if the customer 106 verbally states that he is angry but states it in a calm, composed, and/or a respectful manner, then the corresponding word embedding data may indicate that the customer is angry and if input to the ML model 122 is the word embedding without acoustic and/or audio feature data for that portion of the audio, then the ML model 122 may output a value that indicates that the employee 104 had a negative experience during the call, but a more accurate prediction may be that the employee 104 had a neutral experience because the customer 106 remained respectful or was not abusive towards the employee 104. However, by being trained to output value(s) based at least in part on the extracted acoustic and/or audio feature data, the ML model 122 may determine that the customer 106, while verbally stating is angry, is being respectful towards the employee 104, and the trained ML model 122 may more likely output a value that indicates that the employee 104 is having a neutral experience or not a negative experience. Similarly, if the customer 106 does not make any verbal statements that indicates that he is angry, frustrated, or being rude, but is shouting at the employee 104 during the call, then the corresponding word embedding data may not indicate that the customer is angry, frustrated, or being rude. In such scenarios, if input to the ML model 122 is the word embedding data without acoustic and/or audio feature data for that portion of the audio, then the ML model 122 may output a value that indicates that the employee 104 did not have a negative experience during the call. However, a more accurate prediction may be that the employee 104 is having a negative experience because the customer 106 is shouting at the employee 104. The model 122, by being trained to output value(s) based at least in part on the extracted acoustic and/or audio feature data, may determine that the customer 106 is being rude to the employee 104 because the extracted acoustic and/or audio feature data indicate that the customer 106 is shouting even though the customer 106 is not saying anything indicates that he is angry, frustrated, or being rude.

Various techniques for processing audio data to determine emotion data may be used. Examples of such techniques are discussed in U.S. Pat. No. 10,276,188 issued on Apr. 30, 2019 in the name of Cogito Corporation (and corresponding to U.S. patent application Ser. No. 15/264,463 filed on Sep. 13, 2016) and in U.S. Pat. No. 11,244,698 issued on Feb. 8, 2022 in the name of Cogito Corporation (and corresponding to U.S. patent application Ser. No. 16/297,108 filed on Mar. 8, 2019). The above patents are herein incorporated by reference in their entireties.

The EX component 120 may be configured to generate an EX score for the employee 104 based on the output value(s) of the ML model 122. In some embodiments, the EX score may be a score between one through five. In another embodiment the EX score may be a score from one to three. In some embodiments, the EX score may be defined to be on a different numerical scale than the output value(s) of the ML model 122, and the EX component 120 may be configured to map different output values of the ML model 122 to different numerical values on the EX score scale.

As described above, the EX component 120 may process the snippets and/or portions of the received stream of audio data in different time intervals using a sliding window approach, and in each of those time intervals, the EX component 120 may provide, as inputs, the corresponding the extracted acoustic and/or audio features, the generated word embedding data, an EX score generated at a previous time interval, and/or other non-audio data. In each of the time intervals, the ML model 122 may output value(s) indicating the experience of the employee 104 during the communication with the customer 106 in that time interval based on the inputs received in that time interval. In each of the time intervals, the EX component 120 may generate and/or update the EX score based on the output value(s) of the ML model 122 in that time interval. For example, during the call, as the streams of audio data are received by the system(s) 118, the EX component 120 may in real-time or near real-time start processing a first time interval t0 (e.g., first 16 milliseconds) of the audio data, provide the above-described inputs to the ML model 122, and, based on the output of the ML model 122 during the first time interval, generate a first EX score for the employee 104 for the first time interval. Then, the EX component 120, in real-time or near real-time, may start processing a second time interval t1 (e.g., next 16 milliseconds) of the audio data, provide the corresponding inputs to the ML model 122 for that time interval t1, and then based on the output of the ML model 122 during the second time interval, update the first EX score to generate a second EX score for the employee 104. The second EX score may indicate the employee 104's experience over the time period of intervals t0 and t1 (e.g., for the first 32 milliseconds of the call with the customer 106). Similarly, the EX component 120 may generate EX scores for the remainder of the call between the employee 104 and the customer 106. As such the EX component 120 generates and/or updates an EX score for the employee 104 in real-time or near real-time for the duration of the call with the customer 106.

The EX score determined and/or generated by the EX component 120 indicates an emotional well-being of the employee 104 during and/or after the communication with the customer 106 rather than indicating a performance level of the employee 104 during the communication with the customer 106. In other words, the determined and/or generated EX score does not rate an employee's job performance, but rather quantifies an employee's well-being and/or satisfaction with the employee's job. Different techniques may be used to rate an employee's job performance, such as those described in Published U.S. Patent Application US 2022/0172230 published on Jun. 2, 2022 in the name of Cogito Corporation (and corresponding to U.S. patent application Ser. No. 17/541,197 filed on Dec. 2, 2021). The above patent application is herein incorporated by reference in its entirety. Although a system may simultaneously use job performance scoring and employee experience (EX) scoring, the present disclosure focuses on the EX scoring.

The EX component 120 may cause the EX for the employee 104 to be displayed on a computing device associated the employee 104 (e.g., computing device 114) and/or on a computing device (e.g., computing device 116) associated with one or more employees that supervise employee 104, such as employee 108. The EX score (or an icon/graphical element representative thereof) may be displayed in a graphical user interface (GUI) of computing devices 114, 116. Examples of the GUI may include, but are not limited to, graphical dashboards, and other similar GUIs rendered by a software application being executed on the devices 114, 116. Additional details of the GUI displaying EX scores of the employee 104 are described below with reference to FIG. 9.

In some embodiments, EX component 120 may cause the EX score for the employee 104 to be displayed in real-time or near real-time on the computing device 116 (e.g., a GUI displayed on the computing device 116) to allow supervising employee 108 to monitor the well-being of the employee 104 in real-time or near real-time. For example, supervising employee 108, based on changes to the EX score of the employee 104 during the call, may decide to listen in to the call between employee 104 and customer 106 (if permitted), to connect via messaging service, employee 104 and supervising employee 108 to offer assistance, or some other action to be taken by supervising employee 108 to assist employee 104. In some embodiments, the EX component 120 may be configured to monitor changes to the EX scores during the call, and determine whether the changes satisfy a threshold EX score change value. The EX component 120, in response to determining that the changes satisfy the threshold EX score change value, may generate one or more alerts. In some embodiments, prompting a supervisor, such as employee 108, to listen in to the call or check-in on employee 104 (e.g., during the call, post call, or at a different time period). In some embodiments, the one or more alerts may indicate the changes to the EX score, that the EX score satisfied (e.g., exceeded) a threshold EX score change value, and/or other information related to well-being of the employee 104.

In some embodiments, the EX component 120 may refrain from causing the EX score for the employee 104 to be displayed on the computing device 114 associated with employee 104 until the call between the employee 104 and the customer 106 terminates. This may be done to allow employee 104 to focus on the customer 106 during the duration of the call. In some embodiments, the system (through EX component 120 or otherwise) may request the employee 104 provide their own experience of the call. The system may then use that feedback to retrain and/or update one or more ML model(s) 122. For example, the EX component 120 may cause a prompt to be displayed on the computing device 114 requesting employee 104 to provide their feedback of the call in a numerical value on the same scale or range as the EX score scale or range, and provide the numerical value feedback provided by the employee 104 as an input to the ML model 122 to retrain and/or update the ML model 122.

As described above, the EX component 120 may be configured to determine and/or detect audio events, individual speaking patterns, and interaction patterns. The EX component 120 may be configured to generate one or more guidance prompts for employee 104 based on the determined and/or detected audio events, individual speaking patterns, and interaction patterns, and may cause the one or more guidance prompts to be displayed on computing device 114 associated with the employee 104. Different techniques may be used to determine how and when to provide conversational guidance, such as those described in Published U.S. Patent Application US 2022/0201121 published on Jun. 23, 2022 in the name of Cogito Corporation (and corresponding to U.S. patent application Ser. No. 17/557,478 filed on Dec. 21, 2021). The above patent application is herein incorporated by reference in its entirety. The guidance prompts may provide emotional and/or conversational cues to the employee 104 to improve experience of the employee 104 during the call with the customer 106. The guidance prompts may be displayed in one or more graphical icons and/or in a GUI on the computing device 114 associated with the employee 104. Different techniques may be used to integrate conversational signals into a dialog, such as those described in Published U.S. Patent Application US 2023/0067687 published on Mar. 2, 2023 in the name of Cogito Corporation (and corresponding to U.S. patent application Ser. No. 17/900,037 filed on Aug. 31, 2022). The above patent application is herein incorporated by reference in its entirety. Example guidance prompts are shown in FIGS. 5A and 5B.

Referring now to FIGS. 5A and 5B, there are shown various different examples of guidance prompts that may be generated and/or caused to be displayed by the EX component 120. Examples of guidance prompts may include, but are not limited to, prompt(s) 502 that indicate that the employee 104 is speaking too quickly and should slow down, prompt(s) 504 that indicate that the employee 104 is speaking too slowly and should increase their speaking rate, prompt(s) 506 that indicate that the employee 104 is speaking continuously over a desired amount of time, prompt(s) 508 that indicate that the employee 104 is speaking over the customer 106, prompt(s) 510 that indicate to the employee 104 to acknowledge an emotional state (e.g., angry, sad, frustrated, and the like) of the customer 106, prompt(s) 512 that indicate that there has been extended silence in the call and/or that the employee 104 should indicate their continued attempt at resolving the issue of the customer 106, prompt(s) 514 that indicate that the employee 104 is slow to respond to the customer 106 and/or to acknowledge that the employee 104 has heard the caller, prompt(s) 516 and 518 that indicate to the employee 104 that customer 106 is being rude, disrespectful, frustrated, angry, or is in other similar emotional state, and/or may further indicate or remind the employee 104 to be calm, composed, cordial, and/or respectful to the customer 106.

Some of the guidance prompts may provide positive affirmation to the employee 104. Examples of such guidance prompts may include, but are not limited to, prompt(s) 520 that indicate that the employee 104 is having positive interaction with the customer 106, prompt(s) 522 that indicate that the employee 104 has turned around a call in a positive way (e.g., from a negative experience for the customer 106 into a positive experience for the customer 106 or a neutral experience for the customer 106), and other similar prompts. Some of the guidance prompts may prompt the employee 104 to perform one or more different actions related to the intent and/or purpose of the call with the customer 106. Examples of such guidance prompts may include, but are not limited to, prompt(s) 524, 526, 528, 530, 532, 534, 536, shown in FIG. 5B. Some of the guidance prompts may inform the employee 104 of various different environmental, network, and/or technical issues with the equipment being used by the employee 104. Examples of such guidance prompts may include, but are not limited to, prompt(s) 538 that indicate and/or inform to the employee 104 of degraded audio quality of the call and/or may further request the employee 104 to confirm with the customer 106 whether they can hear the employee 104. Some of the guidance prompts may remind the employee 104 of whether they would like to receive assistance from the supervisor, network, and/or technical issues with the equipment being used by the employee 104. Examples of such guidance prompts may include, but are not limited to, prompt(s) 540 that confirm with the employee 104 for assistance from a supervisor, such as employee 108.

Referring back to FIG. 1, one or more ML models of the ML models 122 may be trained to output value(s) that indicate whether a guidance prompt may be generated by the EX component 120. The EX component 120 may be configured to generate one or more guidance prompts based on the output value(s) by the one or more ML models 122. The one or more ML models 122 may be configured to receive as inputs acoustic and/or audio feature data, determined audio events, individual speaking patterns, interaction patterns, and the like, and, based on these inputs, the one or more ML models 122 may be trained to output value(s) for generation of one or more guidance prompts, such as one or more of the guidance prompts described above. In some embodiments, based on the above described inputs, the one or more ML models 122 may be trained to determine intent of customer speech, intent of employee speech, speaking patterns or behaviors of customer and employee, changes in speaking patterns or behaviors of customer and employee, customer environment (e.g., type of environment), customer demographic information, employee demographic information, emotional state or category of the customer, emotional state or category of the employee, and the like, and based on such determined data or a combination of such determined data, the ML model 122 may be trained to output value(s) indicating whether generation and/or display of a guidance prompt is appropriate or inappropriate. The EX component 120 may be configured to generate and/or cause display of the one or more guidance prompts based on the output value(s) indicating whether generation and/or display of a guidance prompt is appropriate or inappropriate.

For example, an ML model 122 may be trained to determine that the intent of employee 104's speech is reading a required legal disclosure, standard terms and conditions, boilerplate language, and/or other required script, and based on the determined intent, the ML model 122 may be trained to output value(s) that indicate that it would be inappropriate to generate a guidance prompt indicating continuous speaking (e.g., guidance prompt 506) even if the employee 104 has been speaking continuously for a length of time greater than an amount of time considered appropriate for an employee to be speaking continuously in a conversation with a customer. Continuing with the previous example, based on the determined intent, the ML model 122 may be trained to output value(s) that indicate that it would be appropriate to generate a guidance prompt (e.g., guidance prompt 532) reminding employee 104 to check with the customer 106 for their understanding.

As another example, an ML model 122 may be trained to determine that the of intent of employee 104's speech is description of a complicated subject matter (e.g., technical solution for a technology related issue, technical explanation for problem, and the like), and based on the determined intent, the ML model 122 may be trained to output value(s) that indicate that it would be inappropriate to generate a guidance prompt (e.g., 504) requesting the employee 104 to increase their speaking rate if the employee 104 is speaking at a slow rate because employee 104 is talking about a complicated subject matter, where speaking slowly may lead to the employee having a better experience because the customer may have a better understanding of the subject matter and a better experience with the employee.

As one more example, customer 106 may be speaking at a slow speaking rate and the employee 104 may speak at a similar rate as customer 106 to match the speaking rate of customer 106, and the ML model 122 may be trained to output value(s) that indicate that it would be inappropriate to generate a guidance prompt (e.g., guidance prompt 504) requesting employee 104 to increase their speaking rate. As another example, if customer 106 is speaking slowly to emphasize a frustration, then an ML model 122 may determine the emotional state of the customer 106 is frustrated and/or angry, and if the ML model 122 determines that the employee 104 is speaking slowly or begins to speak slowly to match the speaking rate of customer 106, then based in part on the determined emotional state of customer 106, the ML model 122 may be trained to output value(s) that indicate that it would be appropriate to generate one or more guidance prompts for employee 104 to increase speaking rate (e.g., guidance prompt 504), to remain calm (e.g., guidance prompt 518), and/or to acknowledge the frustration or emotional state of customer 106 (e.g., guidance prompt 510).

As described above, in some embodiments, an ML model 122 may be trained to output value(s) indicating whether generation and/or display of a guidance prompt is appropriate or inappropriate based on determining an emotional state (e.g., angry, sad, frustrated, happy, and the like) of a customer and an experience level of the employee 104 (e.g., whether the employee 104 is in training, length of employment or work experience with current organization, a business group of the organization, type(s) of issue(s) a customer indicates, and the like). For example, an ML model 122, based on one or more of the inputs described above, may determine an emotional state of the customer 106 is angry and that an experience level of the employee 104 indicates that the employee 104 is in training, and based on the determined emotional state of customer and experience level of the employee, the ML model 122 may output value(s) that indicate that it would be appropriate to generate one or more guidance prompts for employee 104 recommending supervisor assistance and/or confirming with employee 104 if supervisor assistance is needed (e.g., guidance prompt 540).

As another example, an ML model 122 may determine an emotional state of the employee 104 is changing to a heightened emotional state (e.g., emotional state of anger, frustrated, exasperated, and the like), and based on the determined emotional state of the employee 104, the ML model 122 may output value(s) that indicate that it would be appropriate to generate one or more guidance prompts for employee 104 recommending supervisor assistance and/or confirming with employee 104 if supervisor assistance is needed (e.g., guidance prompt 540). As yet another example, an ML model 122 may determine that employee 104 is an experienced employee (e.g., has a desired length of employment with the organization, desired amount of work experience with the issue of customer 106, in the business group of the organization, and the like), and may output value(s) that indicate that it would be inappropriate to generate a guidance prompt for employee 104 recommending supervisor assistance and/or confirming with employee 104 if supervisor assistance is needed (e.g., guidance prompt 540).

As described above, in some embodiments, an ML model 122 may be trained to output value(s) indicating whether generation and/or display of a guidance prompt is appropriate or inappropriate based on or in part on customer environment (e.g., type of environment). For example, customer 106 may be in a noisy environment and the employee 104, to ensure that the customer 106 is able to hear employee 104, speaks at a louder volume than desired or appropriate when customer 106 is not in a noisy environment. In such a scenario, the ML model 122, based on one or more inputs described above, may determine environment of customer 106 is a noisy environment and may determine intent of employee 104 speaking loudly is to not be rude and/or to ensure customer 106 has a satisfactory experience, and based on the determined environment of customer 106 and the determined intent of employee 104, the ML model 122 may output value(s) that indicate that it would be inappropriate to generate a guidance prompt to speak softly or to remain calm (e.g., guidance prompt 518) or other similar guidance prompts for employee 104.

Continuing with the previous example, the ML model 122, based on one or more of the inputs described above, may determine whether employee 104 provided a warning/ explanation to the customer 106 that the employee 104 will be speaking loudly to ensure the customer 106 can satisfactorily hear employee 104, and the ML model 122 may output value(s) that indicate that it would be appropriate to generate one or more guidance prompt for employee 104 to explain the reason for speaking loudly with the customer 106 if the employee 104 has not provided such an explanation or warning. Similarly, if employee 104 provided such an explanation or warning, the ML model 122 may output value(s) that indicate that it would be inappropriate to generate a guidance prompt for employee 104 to explain the reason for speaking loudly.

An advantage of generating a guidance prompt and/or causing it to be displayed based on output value(s) of one or more ML models 122, as explained in the previous examples, increases the guidance prompt's effectiveness in improving employee's experience score during the call with a customer because the guidance prompt is being generated based on the changing context of the conversation between the employee and the customer.

Another technical advantage of generating the guidance prompts based on determined context is that improves accuracy of a generated guidance prompt and further improves accuracy of a timing for generation of the guidance prompt. Improving accuracy of the generated guidance prompt and the timing of generation of the guidance prompt may also result in fewer guidance prompts being generated, saving computing resources of a computing device and/or a system, and may also improve useability of a GUI displaying such guidance prompts and reducing computing resources consumed by GUI displayed on employee's computing device.

The system(s) 118 (e.g., via the EX component 120 or another component of system(s) 118) may be configured to store a generated EX score for employee 104 in a data storage unit (not shown separately) associated and/or communicatively coupled with system(s) 118. The EX component 120 may store the EX score in association with the employee 104. For example, the EX component 120 may store the EX score in association with an identifier (e.g., employee identifier number, and the like) of the employee 104. For each communication between an employee and a customer, the EX component 120 may also store the data associated with a communication between the employee and the customer. As described above, the data associated with the communication may include audio data of the communication (e.g., call), and non-audio data associated with the communication, and the EX component 120 may store such data in association with an identifier of the employee, an identifier associated with the communication (e.g., a unique identifier associated with a communication session, a unique identifier associated with the call, and the like) between the employee 104 and the customer 106, and the like.

For the communication between the employee 104 and the customer 106, the EX component may store one or more indications identifying one or more topics discussed between the employee 104 and the customer 106. In some embodiments, an ML model 122 may be trained to output value(s) identifying one or more topics discussed between an employee and a customer during their communication, where the identified topic(s) are based data related to the received audio and/or non-audio data described above. In some embodiments, an ML model 122 may be trained to output value(s) identifying one or more topics discussed between an employee and a customer during their communication based on input data to the model 122 related to the received audio and/or non-audio data described above. Based on the output value(s) of the ML model 122, the EX component 120 may be configured to determine the one or topics discussed between the employee and the customer during their communication, and store the one or more indications identifying the one or more topics.

In some embodiments, for each EX score generated and/or stored by the EX component 120, the EX component may store a score indicating a customer experience, referred to herein as a CX score, in association with an identifier of the communication. (Determination of a CX score may be performed by a CX component of the system and may use techniques such as those incorporated by reference above.) For example, for the communication between the employee 104 and the customer 106, the EX component may store the corresponding CX score in association with an identifier of the employee, an identifier associated with the communication (e.g., a unique identifier associated with a communication session, a unique identifier associated with the call, and the like) between the employee 104 and the customer 106, and the like.

As described above, the system(s) 118 may be configured to (e.g., via EX component 120 or another component) cause display of one or more EX scores of one or more employees (e.g., employee 104) and/or other above-described stored data related to the one or more EX scores or the employee above in a user interface of one or more computing devices. The EX score and the other data related to the EX score described above may be referred to herein as EX data. The user interface may be a GUI displayed and/or rendered on a computing device associated with the employee and/or another employee, such as a supervisor of the employee, and the like. In some embodiments, the GUI may be part of a software application associated with and/or hosted in an environment (e.g., cloud computing environment) communicatively coupled with the system(s) 118. In some embodiments, the software application may be hosted in an environment configured and/or provided by the system(s) 118. In some embodiments, the system(s) 118 may be configured to receive requests, via an application programming interface (API), from a computing device associated with an employee (e.g., supervising employee 108, employee 104) for any of the above-described EX data, and the system(s) 118 may be configured to send the requested EX data via the API.

Figure 6:

Referring now to FIG. 6, there is illustrated an example portion of a user interface, GUI 602, displaying EX data described above. GUI 602 may include one or more graphical elements that are configured to display various EX data. Access to different EX data may be based on one or more user defined access configurations associated with an employee (e.g., call operator, supervisor, etc.). For example, a user defined access configuration may indicate that EX data of other employees may only granted to employees in a role of a supervisor (e.g., employee 108), managers, directors, and the like of the organization. Similarly, another user defined access configuration may indicate that EX data for a team of employees is accessible to an employee in the role of a supervisor or a higher-up employee in a direct reporting chain to the employee whose EX was scored but not another to another employee who is supervisor for another team not in a reporting chain for the scored employee. In some embodiments, employees may be grouped into different groups such of employees, for example call service agents (e.g., employee 104), supervisors (e.g., employee 108), managers, quality managers, and directors. Each group of employees may be associated with one or more configurations indicating access to different types of EX data.

In some embodiments, the system(s) 118 (e.g., via the EX component 120) may cause the GUI 602 to be modified based on an access configuration associated with the employee accessing the GUI and/or requesting access to EX data. For example, GUI 602, as shown in FIG. 6, is an example GUI for a supervisor, such as employee 108. However, the system(s) 118 may cause the GUI 602 to be modified if employee 104 were logged-in to the computing device and/or were requesting access to the EX data. Similarly, the system(s) 118 may modify the GUI 602 if an employee with a different access level (e.g., manager, quality manager, director, and the like) were to access the GUI. GUI 602 may be graphical dashboard configured to provide data related to the team of employee 108.

Figure 7:
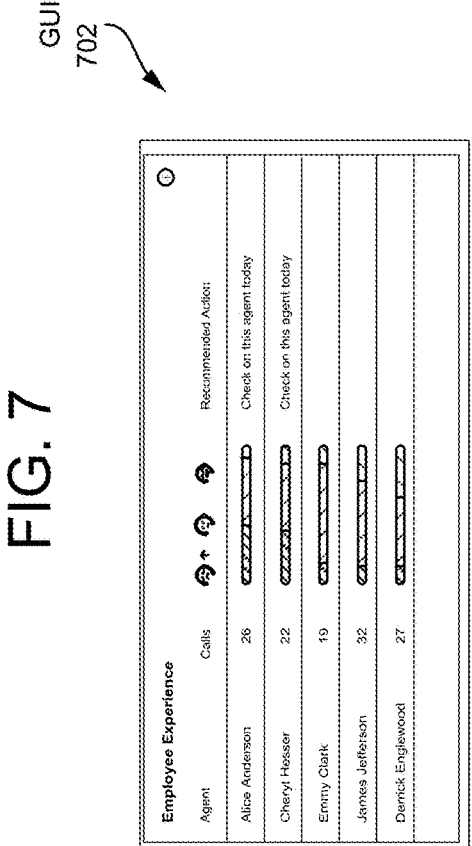
Figure 8:
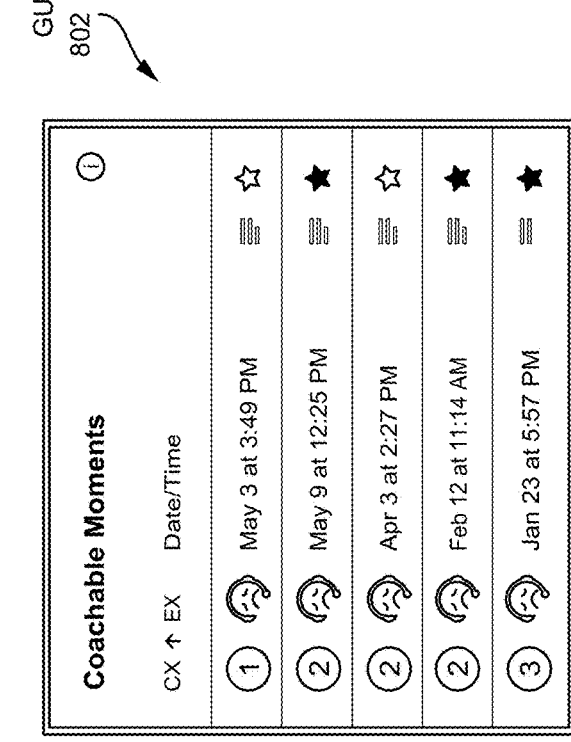

As described above, EX data displayed in the GUI 602 may be provided by the system(s) 118 (e.g., via the EX component 120 or another component). The EX component 120 or another component of system(s) 118 may be configured to aggregate EX data in various different ways. For example, the EX component 120 or another component may be configured to determine a percentage of calls with low EX scores, with neutral EX scores, and/or with high EX scores, etc. for different time periods (e.g., last X number of hours, for the day, for the week, for the month, for the year, and the like), and cause the determined percentage of calls to be displayed in graphical element in GUI 602. In some embodiments, the system(s) 118 (e.g., via EX component 120 or another component) may generate one or more alerts for supervisor employee 108 based on the generated EX data and/or any trends in the generated EX data. The one or more alerts may indicate one or more actions to be taken by the employee 108. For example, if percentage of calls with low EX scores is increasing over the last two weeks, then the system(s) 118 may generate an alert indicating the supervising employee 108 to further investigate a root cause for such a trend. An example GUI indicating an action for the supervisor to take is shown in FIG. 7, where GUI 702 identifies employees with whom the supervising employee 108 should check on (e.g., for the employees' mental well-being). Another example GUI alerting supervising employee 108 to check on one or more employees on their team is shown in FIG. 8. In FIG. 8, the system(s) 118 may determine that an EX score for an employee is below a threshold statistical measurement (e.g., a standard deviation away from their average EX score) and may identify those employees graphically via GUI 802 (e.g., by adding a star next to the employee as shown in FIG. 8).

As an example, if a percentage of calls with low EX scores is increasing over the last two weeks, then the system(s) 118 (e.g., via the EX component 120 or another component) may be configured to identify different topics discussed during those calls, and may further determine most common occurring topics amongst the calls with low EX scores. In the alerts, the system(s) 118 may include data related to the topics discussed and/or most common occurring topics during the low EX score calls along with potential ways to improve the EX with respect to calls involving those topics (e.g., taking a break after such a call, slowing the conversation during such a call, suggesting talking points for such a call, etc.).

GUI 602 may also display graphical elements and/or icons identifying different calls for different employees (e.g., agents). In some embodiments, as shown in FIG. 9, for each call identified in GUI 902, EX data associated with the call may displayed. For example, for each call, an EX score of the employee, a face icon corresponding to the EX score (for example a frown for a low EX score, a smile for a high EX score or the like, with gradations of frown/smile depending on the EX score), a CX score of the customer, a length of the call, and/or other similar EX data may be displayed. In some embodiments, for each call, GUI 902 may indicate whether the call is an on-going live call or a completed call. As shown in FIG. 9, the GUI may provide a supervising user with the ability to playback call audio if the system is so configured.

Figure 10:
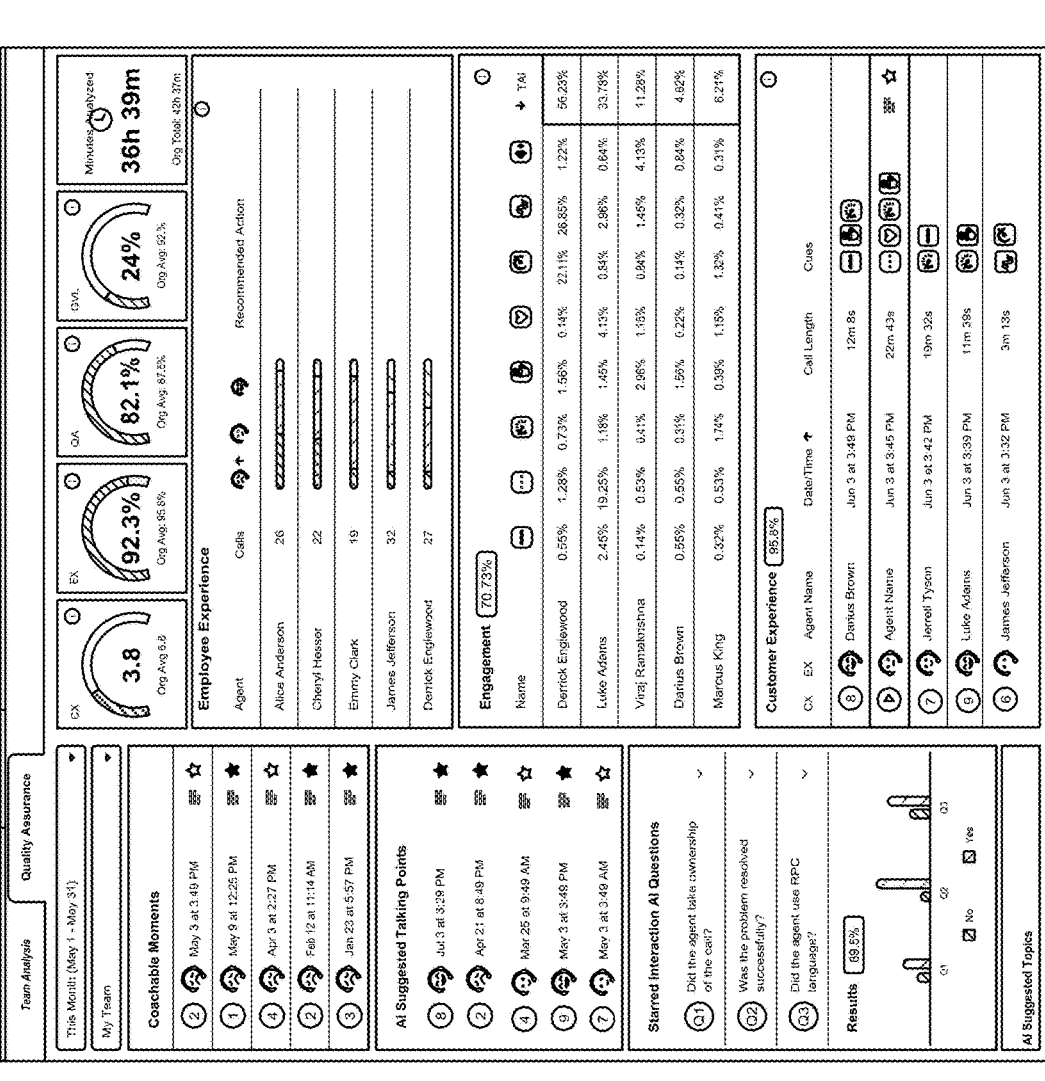

Referring now to FIG. 10, there is illustrated another example portion of a user interface, GUI 1002, displaying EX data described above. GUI 1002 is an example GUI for a different employee than the supervisor employee. For example, GUI 1002 may be GUI for a quality assurance (QA) manager. As described above, a GUI displayed for an employee may be modified from another GUI based on the employee accessing the GUI, the corresponding EX data, and/or the configuration settings corresponding to the viewing employee. For example, a QA manager employee may be granted access to more EX data than a supervisor employee based on access configuration associated with the QA manager. For example, access configuration may indicate that a QA manager may be granted access to EX data related to teams of various different supervisors of a business group. GUI 1002 may display such EX data over any period of time (e.g., last X number of hours, for the day, for the week, for the month, for the year, and the like).

As an example, the system(s) 118 (e.g., via EX component 120 or another component) may determine data indicating a percentage of calls with neutral or high EX scores relative to all the calls that have been handled by a business group for a period of time based on the stored EX data described above. The system(s) 118 may cause display, in GUI 1002, of the determined data for the requested period of time. Similarly, as shown in FIG. 10, GUI 1002 may display other EX data, such as average CX score for the business group, average CX score for organization, total number of monitored call hours for the business group, total number of monitored call hours for the organization, and the like.

In some embodiments, the system(s) 118 (e.g., via the EX component 120 or another component) may be configured to determine an engagement score with one or guidance prompts for each employee (e.g., employee 104) based on whether the employee followed the emotional and/or conversational cues indicated in the one or more guidance prompts describe above. For example, an ML model 122 may be configured to receive, as inputs, data indicating a type of guidance prompt generated, audio data, and/or non-audio data of the call, and the ML model 122 may be trained to output value(s) indicating whether the employee 104 followed emotional and/or conversational cues indicated in the guidance prompt. The EX component 120 may determine that whether or not the employee 104 engaged with a guidance prompt based on the output value(s) of the ML model 122. The EX component or another component of the system(s) 118 may store the determined engagement data for the call in association with a unique identifier (e.g., identifier of the call, identifier of the employee, and the like). The system(s) 118 (e.g., via the EX component 120 or another component) may be configured to aggregate the engagement data over any requested time period and cause display of the aggregated engagement data in a GUI as shown in GUI 1002.

Figure 11:
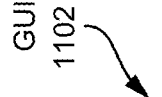

The system(s) 118 may be configured to allow employees to access EX data based on different filtering or search criteria. Referring now to FIG. 11, there is illustrated another example portion of a user interface. GUI 1102 may include one or more graphical elements configured to allow employee to interact with search function of the system(s) 118 (e.g., via the EX component 120 or another component) to access and/or retrieve EX data. The search function may be configured to retrieve various EX data based on based on different filtering or search criteria. For example, search function of the EX component 120 may be configured to retrieve data related to topic(s) discussed during a call, topics discussed during a longer period (e.g., topics during mornings, topics discussed during evening time, topics discussed during a week, topics discussed over a month and the like), time of a call and/or other similar filtering or search criteria. Interaction with the graphical elements of GUI 1102 shown in FIG. 11 may cause the EX component 120 or another component of the system(s) 118 to retrieve and/or cause presentation of corresponding data based on the input filtering and/or search criteria.

The one or more models 122 described herein may be trained using labeled call data (e.g., audio data and/or lexical data) corresponding to various different calls. For example, some of the calls may be calls where employees had good experiences, some of the calls may be calls where employees had not good or bad experiences, some of the calls may be calls where the employees had neutral experiences, and the like. The labels may indicate whether an employee in the call had a good experience, a bad experience, or a neutral experience during the corresponding call. The labels may indicate an EX score for the employee for the call. In some embodiments, the labels may provide an EX score for the entire call. In some embodiments, different portions of the call data may be labeled with corresponding EX scores. For example, the call data for the entire call may be segmented into multiple portions, and each portion may be provided with its own EX score. In some embodiments, the labels may also indicate different metadata described above.

As described above, the system(s) 118 (e.g., via EX component 120 or other component(s)) may be configured to generate one or more notifications for a supervisor of the employee 104, such as employee 108, based on data related to received audio data. The data related to the received audio data may include inputs to an ML model 122 as described above, an EX score described above, an accumulated EX score described above, and the like. The system(s) 118 may cause the one or more notifications may to be displayed on a computing device associated with the supervisor, such as computing device 116. Examples of the one or more notifications for the supervisor are shown in FIG. 12.

Referring to FIG. 12, there are shown various examples of notifications that may be generated and/or caused to be displayed by the system(s) 118 (e.g., EX component 120 or other component(s)). Examples of the notifications may include, but are not limited to, notifications that indicate a low EX score of employee 104 during the call with customer 106, and may indicate one or more actions for the supervisor to perform to improve the experience of the employee 104. Examples of the one or more actions for the supervisor to perform may include, but are not limited to, contact employee 104 to check on mental health of the employee 104, review the audio data associated with the call, encourage employee to take an extended break, and the like. Notification 1202 is an example notification that indicates that the employee 104 has a low EX score for employee 104 for a recent or current call with customer 106 and further indicates that contacting employee 104 to check on mental health of the employee 104. Similarly, notification 1204 is an example notification that indicates that the employee 104 has a low EX score and further requests the supervisor to review the audio data of the call. Notification 1206 is an example notification that indicates that the employee 104 has a low EX score and further requests the supervising employee (e.g., employee 108) to encourage the employee 104 to take an extended break (e.g., longer than a usual break during work hours) to limit affects the call on the mental well-being of the employee 104.

Another example of a notification, such as notification 1208, may indicate that the EX score of employee 104 is fails to satisfy a threshold standard deviation range from an aggregated EX score and further requests supervising employee 108 to check on mental health of employee 104. In another example, a notification, such as notification 1210, may indicate a negative trend in an aggregated EX score of the employee 104 and requests the supervising employee 108 to perform an action (e.g., check on mental health of employee 104). In yet another example, a notification, such as notification 1212, may indicate a positive trend in an aggregated EX score of the employee 104.

In yet another example, a notification, such as notification 1214, may indicate an EX score of the employee 104, one or more topics identified by the system(s) 118, one or more portions of the audio data of call where the topics were discussed, and requests the supervising employee 108 to perform an action (e.g., check the indicated portions of the call audio data) to determine the reason for the employee having a bad experience. In yet another example, a notification, such as notification 1216, may indicate that a work schedule of employee 104 has been modified based on aggregated EX score of employee 104. For example, the system(s) 118 may determine that an aggregated EX score of employee 104 fails to satisfy a threshold EX score, and in response may determine that reducing the workload for the employee 104 may help improve mental health of the employee 104. In yet another example, a notification, such as notification 1218, may indicate that the employee 104 has been removed from a call queue based on aggregated EX score of employee 104. For example, the system(s) 118 may determine that an aggregated EX score of employee 104 fails to satisfy a threshold EX score, and in response may determine one or more topics caused the employee 104 to have a bad experience, and then may remove the employee 104 from the call queues of the one or more topics for a period of time (e.g., predetermined time, user defined time, and the like) temporary that reducing the workload for the employee 104 may help improve mental health of the employee 104.

Referring to FIG. 13, there is shown a flowchart illustrating operations of an example method 1300 for generating an EX score, according to embodiments of the present disclosure. The method 1300 (illustrated in FIG. 13) may be performed by the system(s) 118 (e.g., via the EX component 120 or another component of system(s) 118) of the system 100. In some embodiments, computing device associated with an employee (e.g., computing device 114 associated with employee 104, computing device 116 associated with supervising employee 108, and the like) may include an EX component 120 or other similarly configured component(s) and all operations may be performed by the computing device associated with the employee. In some embodiments, some of the operations may be performed by the computing device(s) 114, 116, some of the operations may be performed by the system(s) 118, other configuration depending on operation of the system 100.

The method 1300 may include receiving (1302) first audio data corresponding to a call between a first speaker using a first device and a second speaker using a second device, wherein the first speaker is communicating with the second speaker as part of the first speaker's employment. The first audio data corresponding to the call may include audio data of the first speaker (e.g., employee 104), and/or audio data of the second speaker (e.g., customer 106) on the call with the first speaker (e.g., employee 104). As described above, in some embodiments, the first audio data may include a first stream of audio data of the first speaker and a second stream of audio data of the second speaker, where the second stream of audio data may be received via a separate channel from the first stream of audio data. The first audio data may be received during the call between the first speaker and the second speaker.

The method 1300 may include generating (1304), based on the first audio data, first text data corresponding to at least a portion of the call. As described above, the system(s) 118 (e.g., via EX component 120 or other component(s)) may be configured to generate text data corresponding to the call by processing the audio data (e.g., the received first audio data) using an ASR model and/or ASR component. In some embodiments, as described above, the systems 118 (e.g., via EX component 120 or other component(s)) may be configured to generate word embedding data based on or using the generated text data corresponding to at least a portion of the call and an NLP model or word embeddings model, such as Word2Vec, GloVe, and the like. In some embodiments, the one or more ML models 122 described herein may include the NLP model or the word embeddings model.

The method 1300 may include generating (1306), using the first audio data, one or more acoustic features corresponding to the first audio data. The one or more acoustic features may be extracted by using the first audio data and an ML model (e.g., an ML model 122) configured to extract acoustic and/or audio feature data. In some embodiments, the one or more acoustic features may include at least one of a vocal pitch indication corresponding to the first speaker or the second speaker, an energy indication corresponding to the first speaker or the second speaker, a speaking rate indication corresponding to the first speaker or the second speaker, and the like.

The method 1300 may include generating (1308) a first call score (e.g., EX score) using at least a first ML model, and based on the first text data, and the one or more acoustic features, where the first call score represents an experience level (e.g., employee experience) of the first speaker (e.g., an employee, such as employee 104) during the call with the second speaker. In some embodiments, the first call score may be generated during the call. In some embodiments, the first call score may be an aggregated score (e.g., an aggregated EX score) indicating an experience of the first speaker (e.g., employee 104) over a time period. For example, the time period may be a time period for a portion of the call, such as from a beginning time of the call until a time, during the call, at which the first call score is generated.

In some embodiments, the first call score may be generated for a first portion of the first audio data, where the first portion of the first audio data corresponds to a first time period of the call. In some embodiments, the method 1300 may include generating a second call score for a second portion of the first audio data, where the second portion of the first audio data corresponds to a second time period of the call. In some embodiments, the first time period is after the second time period, and the first call score is generated, in part, by updating the second call score. As described above, in some embodiments, the systems(s) 118 may be configured to receive a stream of the first audio data in real-time or near real-time during the call, process (e.g., via EX component 120 or other component(s) of the systems(s) 118) one or more portions/snippets (e.g., time intervals) of the stream of the first audio data in real-time or near real-time to generate the word embedding data (1304) and the acoustic feature(s) (1306), and generate (e.g., via EX component 120) the first call score in real-time or near real-time for the corresponding snippet. As such, the generated first call score may be an EX score for the corresponding portion/snippet of the stream of audio data, and/or the generated first call score may be an aggregated EX score over all previous portions/snippets of the stream of the first audio data until and/or including a current portion/snippet of the stream of the first audio data.

As an optional aspect, the method 1300 may include causing (1310) a first action to be performed based at least in part on the first call score. In some embodiments, the first action may be generating a first alert for a supervising employee (e.g., supervisor, manager, QA manager, director, and the like) of the first speaker. In some embodiments, the first action may be causing display of a first alert in a GUI of a computing device (e.g., a computing device in system 100). In some embodiments, the computing device may be associated with the supervising employee (e.g., supervisor, manager, QA manager, director, and the like) of the first speaker. For example, the system(s) 118 (e.g., via EX component 120) may be configured to determine whether the first call score satisfies a threshold value (e.g., a standard deviation away from an average EX score for that employee, and/or other statistical measurements) and, based on the first call score satisfying the threshold value, the system(s) 118 may determine the first action to be performed may be an alert for a supervising employee, where the alert may indicate the first call score, that the first call score satisfies a threshold deviation, and/or provide the supervising employee with one or more actions to perform, such as reviewing the call, contacting the employee, and the like.

In some embodiments, the method 1300 may include determining, based on the one or more acoustic features, at least one of a first sentiment of a first speaker or a second sentiment of a second speaker, and where the first call score is generated based in part on the first sentiment or the second sentiment. A sentiment of a speaker may indicate an emotional state of the speaker (e.g., emotional state of the employee, emotional state of the customer, and the like). In some embodiments, an ML model 122, based in part on input acoustic features extracted from the employee audio data or the customer audio data, may classify or determine an emotional state of the employee or customer, and output one or more values indicating the emotional state of the employee and/or customer. In some embodiments, the one or more values indicating the emotional state of the employee and/or the customer may be provided as input to an ML model 122 trained and/or configured to output the value(s) indicating an experience level (e.g., EX score) of the employee 104 based in part on the one or more values indicating the emotional state of the employee and/or the customer. In some embodiments, a part (e.g., one or more layers) of the ML model 122 may classify or determine an emotional state of the employee or customer, based in part on input acoustic features extracted from the employee audio data or the customer audio data, output one or more values indicating the emotional state to another layer of the ML model 122, and the other layer or yet another layer of the ML model 122 may output the value(s) indicating an experience level (e.g., EX score) of the employee 104 based in part on the one or more values indicating the emotional state of the employee and/or the customer. As described above, the acoustic features data may comprise and/or represent at least one of a vocal pitch indication corresponding to the first speaker (e.g., employee 104) or the second speaker (e.g., customer 106), an energy indication corresponding to the first speaker or the second speaker, a speaking rate indication corresponding to the first speaker or the second speaker.

In some embodiments, the method 1300 may include determining, based on the first text data, a third sentiment of the first speaker or a fourth sentiment of the second speaker, and where the first call score is generated based on the first sentiment and the third sentiment or the second sentiment and the fourth sentiment. In some embodiments, an ML model 122, based on or in part on the generated text data, may classify or determine an emotional state of the employee or customer, and output one or more values indicating the emotional state of the employee and/or customer. In some embodiments, a part (e.g., one or more layers) of the ML model 122 may classify or determine an emotional state of the employee or customer, based in part on generated text data, output one or more values indicating the emotional state to another layer of the ML model 122, and the other layer or yet another layer of the ML model 122 may output the value(s) indicating an experience level (e.g., EX score) of the employee 104 based in part on the one or more values indicating the emotional state of the employee and/or the customer based on the text data, and the one or more values indicating the emotional state of the employee and/or the customer based on the acoustic features. For example, as described above, an ML model 122 may output value(s) indicating an experience level (e.g., EX score) of the employee 104 based in part on an emotional state of the employee 104 or the customer 106 classified or determined based on acoustic features extracted from the employee audio data or the customer audio data and an emotional state of the employee 104 or the customer 106 classified or determined based on the text data corresponding to the call (or word embedding data corresponding to the audio data or the customer audio data). In some embodiments, the sentiment classified or determined based on the acoustic features and the sentiment classified or determined based on the text data (or the word embedding data) may be the same or different. For example, during the call, if the customer states that they are frustrated but remains calm while speaking, then the sentiment classified or determined based on the text data (or the word embedding data) may indicate that the customer's emotional state is frustrated but the sentiment classified or determined based on by the acoustic features may indicate that the customer is calm or respectful, therefore the employee may not have had a bad experience during the communication with the customer.

In some embodiments, the method 1300 may include receiving second text data associated with the call, and generating a second word embedding data corresponding to the second text data. The second text data may be text data from one or more chat messages, electronic mail messages, and/or other digital communication. In some embodiments, the method 1300 may include determining, based on the second text data, a sentiment of the first speaker and/or a sentiment of the second speaker, and where the first call score is generated based in part on the first sentiment or the second sentiment. In some embodiments, the method 1300 may include determining, based on the second word embedding data, a sentiment of the first speaker and/or a sentiment of the second speaker, and the first call score may be generated based in part on the sentiment(s) indicated by the second word embedding data.

Referring to FIG. 14, there is shown a flowchart illustrating operations of an example method 1400 for generating a notification to improve an experience level of an employee, according to embodiments of the present disclosure. The method 1400 (illustrated in FIG. 14) may be performed by the system(s) 118 (e.g., via the EX component 120 or another component of system(s) 118) of the system 100. In some embodiments, computing device associated with an employee (e.g., computing device 114 associated with employee 104, computing device 116 associated with supervising employee 108, and the like) may include an EX component 120 or other similarly configured component(s) and all operations may be performed by the computing device associated with the employee. In some embodiments, some of the operations may be performed by the computing device(s) 114, 116, some of the operations may be performed by the system(s) 118, other configuration depending on operation of the system 100.

The method 1400 may include receiving (1402) first audio data corresponding to a call between a first speaker using a first device and a second speaker using a second device, where the first speaker is communicating with the second speaker as part of the first speaker's employment, and where the first audio data is received during the call. As described above, the first audio data may include audio data of the first speaker and/or audio data of the second speaker on the call.

The method 1400 may include generating (1404), using a first ML model (e.g., an ML model 122) and based on data related to the first audio data, one or more notifications, wherein at least one notification of the one or more notifications is configured to improve an experience level for the first speaker. As described above, one or more notifications may be an alert indicating one or more actions to improve experience level for the first speaker (e.g., employee 104). For example, the one or more notifications may indicate an action to be performed, such as reviewing the call, contacting the employee, and the like, that may improve the experience level of the first speaker.

The method 1400 may include causing (1406) the one or more notifications to be displayed in a GUI of a computing device. In some embodiments, the computing device may be a computing device associated with the first speaker or a supervisor of the first speaker (e.g., manager, QA manager, director, supervisor, and the like). In some embodiments, the experience level for the first speaker may be a cumulative experience level of the first speaker. For example, the experience level of the first speaker may indicate the emotional well-being of the first speaker after a set or group of calls (e.g., calls over a first half of the day, a second half of the day, at the end of the day, at the end of a week, at the end of a month, and the like).

In some embodiments, the method 1400 may include determining an aggregated call score for the first speaker based on at least a first call score, where the aggregated call score represents an updated cumulative experience of the first speaker. In some embodiments, the method 1400 may include determining whether the aggregated call score satisfies a threshold aggregated call score, and modifying a call schedule for the first speaker in response to the aggregated call score satisfying the threshold aggregated call score. In some embodiments, modifying the call schedule for the first speaker comprises removing the first speaker from a call queue, determining a revised time at which the first speaker/ employee should receive a next call, or other action.

In some embodiments, the data related to the first audio data indicates a difference between the first call score and the aggregated call score satisfies a threshold difference; and the at least one notification indicates data representing the first call score and a follow-up discussion with the first speaker. In some embodiments, the first call score is generated using a second ML model and the first audio data, and the first call score corresponds to an experience level of the first speaker during the communication with the second speaker.

In some embodiments, the method 1400 may include determining one or more topics discussed during the call based in part on the first audio data, and identifying one or more portions of the first audio data corresponding to the one or more topics, where the one or more notifications may indicate the one or more portions of the first audio data. In some embodiments, the data related to the first audio data is a first call score corresponding to an experience level of the first speaker during the communication with the second speaker, and the at least one notification indicates that the first speaker requires assistance of a supervisor of the first speaker during the call.

In some embodiments, the method 1400 may include determining, based on data related to the call, whether the call is a high performer call type or a low performer call type. In some embodiments, a notification of the one or more notifications may indicate whether the call is the higher performer call type or the low performer call type. As described herein, a high performer call type may be a category or a type of call that indicates that a customer involved in the call is satisfied with the call. For example, a call may be a high performer call type if a customer is happy with the call. In some embodiments, data related to the call may be a score (e.g., a performance score, a rating, and the like) indicating whether the call is a high performer call type or a low performer call type. In some embodiments, the system(s) 118 may be configured to determine whether the performance score indicates a high performer call type or a low performer call type based on a comparison between the performance score and a threshold score. For example, if the score satisfies the threshold score, then the system(s) 118 may determine that the call is a high performer call type, and if the performance score does not satisfy the threshold score, then the system(s) 118 may determine that the call is a low performer call type. In some embodiments, the system(s) 118 may receive the score (e.g., a performance score, a rating, and the like) indicating whether the call is a high performer call type or a low performer call type. For example, the system(s) 118 may receive the s performance core from a third party provider or entity, or another system or device configured to generate the score based on the call data, customer data, or other data related to the call.

In some embodiments, the data related to the call may comprise a call score representing an experience level of the second speaker (e.g., the customer 106) during the call. For example, the data related to the may be a CX score indicating or representing the customer's experience (e.g., happy, neutral, angry, and the like) with the call. In some embodiments, the system(s) 118 (e.g., via EX component or other component(s)) may be configured to generate the call score (CX score) indicating or representing the customer's experience with the call. For example, an ML model 122 or another ML model may be trained and/or configured to output value(s) indicating a customer's experience (e.g., happy, neutral, angry, and the like) with the call based on audio data of the call, extracted acoustic features and/or audio data features, corresponding text data, corresponding word embedding data, and/or other inputs to ML models described above with reference to FIGS. 1-13.

In some embodiments, the method 1400 may include, in response to determining that the call is the high performer call type, determining an average call score representing, on average, an experience of an employee during a call of the high performer call type. The average call score may be based on a set of call scores corresponding to multiple calls of high performer type. In some embodiments, the method 1400 may include, in response to determining that the call is the low performer call type determining an average call score representing, on average, an experience of an employee during a call of the low performer call type. The average call score may be based on a set of call scores corresponding to multiple calls of low performer type. In some embodiments, a notification of the one or more generated notifications may indicate that the average call score for the high performer call type and/or the average call score for the low performer call type.

In some embodiments, the method 1400 may include, determining, based on the first audio data, a first intent of the second speaker (e.g., customer 106). In some embodiments, intent of the customer may include but are not limited to the purpose of the call, an issue the customer is trying to resolve or needs assistance in resolving, and the like. For example, if a customer is trying to resolve a bill pay issue or needs assistance with bill pay, then the system(s) 118 (e.g., via EX component or other components) may determine that the intent of the customer is bill pay. In some embodiments, an ML model 122 may be trained and/or configured to determine the intent of the customer based on the audio data of the call and output one or more values indicating the intent of the customer, The system(s) 118 (e.g., via EX component or other components) may determine the intent of the customer based on the output values of the ML model. In some embodiments, the system(s) 118 may receive data (e.g., metadata, and the like) that indicates the intent of the customer.

In some embodiments, the method 1400 may include determining, based on the first audio data, a first call score representing an experience level of the first speaker during the call, and determining an average call score representing, on average, an experience of an employee during a call related to the first intent. In some embodiments, the method 1400 may include determining the first call score is below the average call score, and in response to determining that the first call is below the average call score, determining one or more topics associated with the first intent. In some embodiments, the system(s) 118 may be preconfigured with one or more parameters indicating one or more topics associated with an intent of the call. For example, if the intent of the customer is to add an additional user to a wireless plan, one of the topics associated with the intent would be to retrieve name and telephone number of the additional user, another topic may be a sequence of steps to successfully complete in order to add the additional user. In some embodiments, the system(s) 118 may (e.g., via EX component 120 or other components) may be configured to determine that the employee needs additional training in the other one or more topics associated with the intent based on the call score (EX score) being below the average EX score. In some embodiments, the system(s) 118 may be configured to generate a notification that indicates additional training in the one or more topics for the employee.

In some embodiments, the method 1400 may include determining a group associated with the first speaker (e.g., the employee 104). For example, the system(s) 118 may determine a business group, a line of business, a call shift group, a call center, and the like associated with the employee 104. In some embodiments, the method 1400 may include determining, based on multiple call scores corresponding to multiple of calls over a time period (e.g., a duration of shift, a day, a week, a month, multiple days, multiple weeks, multiple months, morning hours, evening hours, night hours, and the like, an average call score for the group. In some embodiments, the method 1400 may include determining a call score representing an experience level of the first speaker during the call and determining the call score is below the average call score. In some embodiments, the system(s) 118 may be configured to determine that that the experience level (e.g., mental health, mental well-being, and the like, as described above with reference to FIGS. 1-13) of the first speaker (e.g., employee 104) is worse than an average experience level of the group based on the call score of the first speaker (e.g., the employee 104) being below the average call score for the group. In some embodiments, the system(s) 118 may be configured to generate a notification indicating that the experience level of the first speaker (e.g., the employee 104) is worse than an average experience level of the group based on the call score of the first speaker being below the average call score.

As can be appreciated, the methods 1300 and 1400 may be operated as part of a same system in various combinations and at a same time/in at least a partially overlapping manner depending on system configuration.

Figure 15:
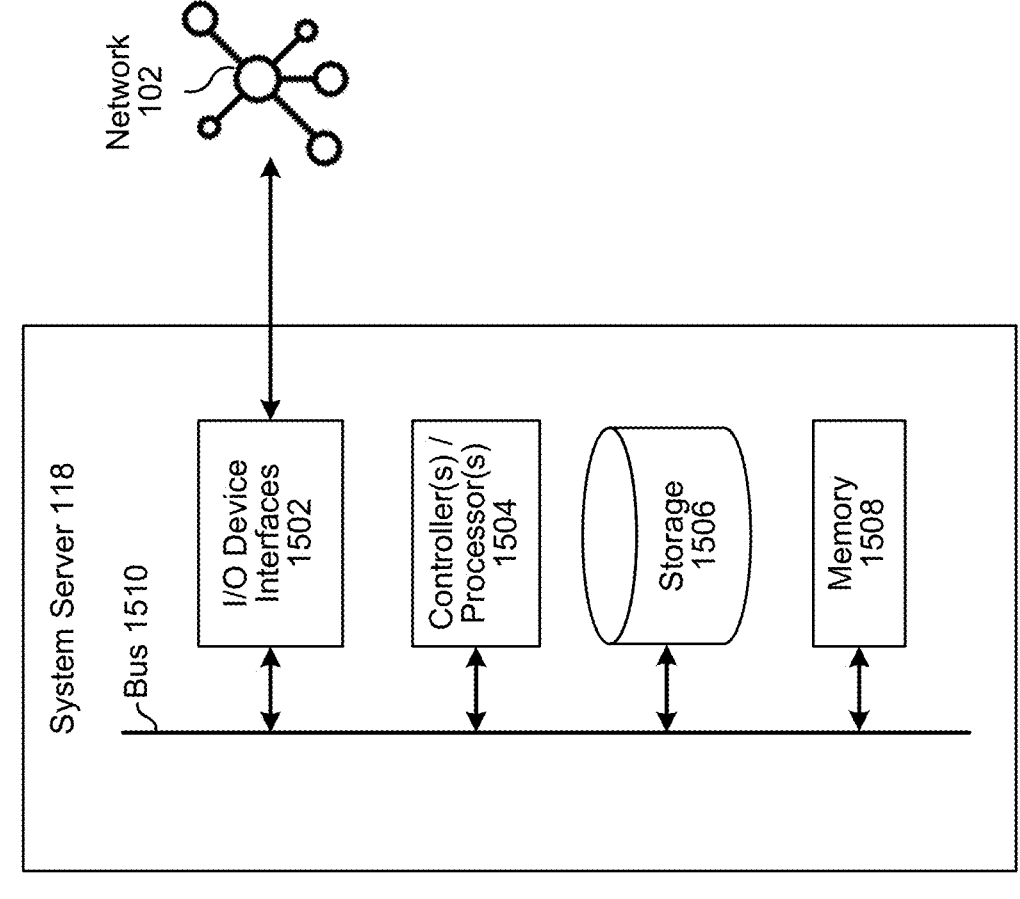
FIG. 15 illustrates components of a system according to embodiments of the present disclosure.

FIG. 15 is a block diagram illustrating a computing environment that includes a server of system 118. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

The server 118 may include one or more input/output device interfaces 1502 and controllers/processors 1504. The server 118 may further include storage 1506 and a memory 1508. A bus 1510 may allow the input/output device interfaces 1502, controllers/processors 1504, storage 1506, and memory 1508 to communicate with each other; the components may instead or in addition be directly connected to each other or be connected via a different bus.

A variety of components may be connected through the input/output device interfaces 1502. For example, the input/output device interfaces 1502 may be used to connect to the network 102. Further components include keyboards, mice, displays, touchscreens, microphones, speakers, and any other type of user input/output device. The components may further include USB drives, removable hard drives, or any other type of removable storage.

The controllers/processors 1504 may processes data and computer-readable instructions and may include a general-purpose central-processing unit, a specific-purpose processor such as a graphics processor, a digital-signal processor, an application-specific integrated circuit, a microcontroller, or any other type of controller or processor. The memory 1508 may include volatile random access memory (RAM), non-volatile read only memory (ROM), non-volatile magnetoresistive (MRAM), and/or other types of memory. The storage 1506 may be used for storing data and controller/processor-executable instructions on one or more non-volatile storage types, such as magnetic storage, optical storage, solid-state storage, etc.

Computer instructions for operating the server 118 and its various components may be executed by the controller(s)/processor(s) 1504 using the memory 1508 as temporary "working" storage at runtime. The computer instructions may be stored in a non-transitory manner in the memory 1508, storage 1506, and/or an external device(s). Alternatively, some or all of the executable instructions may be embedded in hardware or firmware on the respective device in addition to or instead of software.

FIG. 16 illustrates a number of devices in communication with one or more system server(s) 118 using the network 102. Such devices may include a smart phone 1602, a laptop computer 1604, a tablet computer 1606, and/or a desktop computer 1608. These devices may be used to remotely access the system server(s) 118 to perform any of the operations described herein.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and data processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving first audio data corresponding to a call between first speaker using a first device and a second speaker using a second device, wherein the first speaker is communicating with the second speaker as part of employment of the first speaker, wherein the first audio data is received during the call;
generating, using a first machine learning (ML) model and based on first data related to the first audio data, one or more notifications, wherein at least one notification of the one or more notifications is configured to improve an experience level for the first speaker;
generating, using the first audio data, a first call score, wherein the first call score corresponds to an experience level of the first speaker during the call; and
causing the one or more notifications and the first call score to be displayed in a graphical user interface (GUI) of a computing device.

2. The computer-implemented method of claim 1, wherein the experience level for the first speaker corresponds to an experience of the first speaker over an entirety of the call.

3. The computer-implemented method of claim 2, further comprising:
determining, based on at least the first call score, an aggregated call score for the first speaker, wherein the aggregated call score representing a cumulative experience level of the first speaker corresponding to multiple calls with multiple customers.

4. The computer-implemented method of claim 3, wherein:
the first data related to the first audio data indicates a difference between the first call score and the aggregated call score satisfies a threshold difference; and
the at least one notification indicates data representing the first call score and a follow-up discussion with the first speaker.

5. The computer-implemented method of claim 1, wherein:
the first call score is generated using a second ML model and the first audio data.

6. The computer-implemented method of claim 3, further comprising:
determining whether the aggregated call score satisfies a threshold aggregated call score; and in response to the aggregated call score satisfying the threshold aggregated call score, modifying a call schedule for the first speaker.

7. The computer-implemented method of claim 6, wherein modifying the call schedule for the first speaker comprises:
removing the first speaker from a call queue.

8. The computer-implemented method of claim 1, further comprising:
determining, based in part on the first audio data, one or more topics discussed during the call; and
identifying one or more portions of the first audio data corresponding to the one or more topics,
wherein the one or more notifications may indicate the one or more portions of the first audio data.

9. The computer-implemented method of claim 1, wherein the computing device is associated with a supervisor of the first speaker.

10. The computer-implemented method of claim 1, wherein the at least one notification is generated during the call.

11. The computer-implemented method of claim 10, wherein the first data comprises a first call score corresponding to an experience level of the first speaker during the call, and wherein the at least one notification indicates that the first speaker requires assistance of a supervisor of the first speaker during the call.

12. The computer-implemented method of claim 1, further comprising:
determining a call type corresponding to the call, wherein a first notification of the one or more notifications indicates the call type.

13. The computer-implemented method of claim 1, further comprising:
determining, based on the first audio data, a first intent of the second speaker;
determining an average call score representing an average experience of an employee during a call related to the first intent;
determining the first call score is below the average call score; and
in response to determining that the first call score is below the average call score, determining one or more topics associated with the first intent, wherein a first notification of the one or more notifications indicates additional training in the one or more topics.

14. The computer-implemented method of claim 1, further comprising:
determining a group associated with the first speaker;
determining, based on a plurality of call scores corresponding to a plurality of calls over a first time period, an average call score for the group;
and
determining the first call score is below the average call score, wherein a first notification of the one or more notifications indicates that the experience level of the first speaker is worse than an average experience level of the group.

15. A system comprising:
at least one processor; and
at least one memory including instructions that, when executed by the at least one processor, cause the system to:
receive first audio data corresponding to a call between first speaker using a first device and a second speaker using a second device, wherein the first speaker is communicating with the second speaker as part of employment of the first speaker, wherein the first audio data is received during the call;

generate, using a first machine learning (ML) model and based on first data related to the first audio data, one or more notifications, wherein at least one notification of the one or more notifications is configured to improve an experience level for the first speaker;

generate, using the first audio data, a first call score, wherein the first call score corresponds to an experience level of the first speaker during the call; and cause the one or more notifications and the first call score to be displayed in a graphical user interface (GUI) of a computing device.

16. The system of claim 15, wherein the experience level for the first speaker corresponds to an experience of the first speaker over an entirety of the call.

17. The system of claim 16, wherein the at least one memory includes further instructions that, when executed by the at least one processor, further cause the system to:

determine, based on at least the first call score, an aggregated call score for the first speaker, wherein the aggregated call score representing a cumulative experience level of the first speaker corresponding to multiple calls with multiple customers.

18. The system of claim 15, wherein the at least one memory includes further instructions that, when executed by the at least one processor, further cause the system to:

determine, based in part on the first audio data, one or more topics discussed during the call; and identify one or more portions of the first audio data corresponding to the one or more topics, wherein the one or more notifications may indicate the one or more portions of the first audio data.

19. The system of claim 15, wherein the computing device is associated with a supervisor of the first speaker.

20. The system of claim 15, wherein the at least one notification is generated during the call.

* * * * *